United States Patent
Jeon et al.

(10) Patent No.: US 9,916,083 B2
(45) Date of Patent: Mar. 13, 2018

(54) LOCK RELEASE METHOD AND APPARATUS

(71) Applicant: Samsung Electronics Co., Ltd., Gyeonggi-do (KR)

(72) Inventors: Minkyoung Jeon, Gyeongsangbuk-do (KR); Jiwoo Lee, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 114 days.

(21) Appl. No.: 14/886,899

(22) Filed: Oct. 19, 2015

(65) Prior Publication Data

US 2016/0110092 A1    Apr. 21, 2016

(30) Foreign Application Priority Data

Oct. 17, 2014    (KR) .................. 10-2014-0140942

(51) Int. Cl.

| | | |
|---|---|---|
| G06F 3/041 | (2006.01) | |
| G06F 3/0488 | (2013.01) | |
| G06F 21/36 | (2013.01) | |
| G06F 3/0484 | (2013.01) | |
| H04W 12/06 | (2009.01) | |
| H04W 88/02 | (2009.01) | |

(52) U.S. Cl.
CPC ........ *G06F 3/04883* (2013.01); *G06F 3/0484* (2013.01); *G06F 21/36* (2013.01); *H04W 12/06* (2013.01); *H04W 88/02* (2013.01)

(58) Field of Classification Search
CPC .... G06F 21/36; G06F 3/0484; G06F 3/04883; H04W 12/06; H04W 88/02

USPC .................................................. 345/169–176
See application file for complete search history.

(56) References Cited

U.S. PATENT DOCUMENTS

| | | | | |
|---|---|---|---|---|
| 2015/0046885 A1* | 2/2015 | Zhang | ................. | G06F 3/0481 715/863 |
| 2015/0138101 A1* | 5/2015 | Park | ..................... | G06F 3/0412 345/173 |
| 2015/0153946 A1* | 6/2015 | Kim | ..................... | G06F 3/04883 345/173 |

(Continued)

FOREIGN PATENT DOCUMENTS

KR    10-1285613    7/2013

*Primary Examiner* — Tony Davis
(74) *Attorney, Agent, or Firm* — The Farrell Law Firm, P.C.

(57) ABSTRACT

An method for releasing a lock of an electronic device including a touch screen and an electronic device using the same is provided. The electronic device includes a touch screen display and a processor configured to receive two or more touch inputs in a locked state of the electronic device and to release the locked state when the two or more touch inputs coincide with a pattern stored in advance. The processor is further configured to receive a first touch input through the display in the locked state of the electronic device, receive a second touch input through the display after receiving the first touch input, determine whether the second touch input is within a selected region with respect to one or more imaginary axes passing through a position of the first touch input, and determine whether the second touch input coincides at least partly with the stored pattern, based on whether the second touch input is within the selected region.

22 Claims, 11 Drawing Sheets

(56) References Cited

U.S. PATENT DOCUMENTS

2015/0186017 A1* 7/2015 Lee .................. H04M 1/67
  715/771
2015/0195789 A1* 7/2015 Yoon ................ G06F 3/0488
  345/173

* cited by examiner

LOCK RELEASE METHOD AND APPARATUS

PRIORITY

This application claims priority under 35 U.S.C. § 119(a) to Korean Patent Application No. 10-2014-0140942 filed in the Korean Intellectual Property Office on Oct. 17, 2014, the entire content of which is incorporated herein by reference.

BACKGROUND

1. Field of the Invention

The present invention relates generally to a method for releasing a lock of an electronic device.

2. Description of the Related Art

In recent years, thanks to the remarkabale developments of information communication technology and semiconductor technology, the dissemination and use of electronic devices has been rapidly increasing. Such electronic devices are used for taking a picture, finding a user's way somewhere, or calculating a numerical value. Users have recently been able to perform a variety of functions using only a single electronic device; eliminating the need for a user to carry separate devices, such as a camera for taking a picture, a navigation device for finding his or her way, or a calculator for calculating an amount. The electronic device may provide a variety of functions and thereby improve the user's convenience.

Most electronic devices provide a security function for protecting a user's information. In this instance, the electronic device may provide a standardized input guide, such as a pattern lock through a lock screen, in order to derive a correct password input by the user.

However, a gesture password input through the such a standardized input guide may be easily exposed to the outside and may be seen by others in plain view. In addition, the repetitive and constant drag gesture is vulnerable to security breaches because it leaves a trace on the touch screen. For this reason, the provision of the standardized input guide, which has a constant distance/interval/size on the lock screen, may cause the deterioration of security.

SUMMARY

The present invention has been made to address at least the problems and disadvantages described above and to provide at least the advantages described below.

Accordingly, an aspect of the present invention is to provide a lock release method and electronic device which may freely input a password and improve security based on the relative direction information between input touches without fixing a reference touch when determining the direction of a touch.

Accordingly, another aspect of the present invention is to determine a relative direction based on an imaginary axis on the lock screen of an electronic device, with respect to a free touch input by a user on the lock screen, where a single-touch input or a multi-touch input may be utilized as a lock input, thereby improving the security and diversity in the method for releasing the lock.

Accordingly, another aspect of the present invention is to allow a user to set a variety of imaginary axes at the time a lock password for an electronic device is set so that it is possible for the user to adjust the lock security level.

Accordingly, another aspect of the present invention is to display a coordinate axis guide on the screen of the electronic device at the time of a touch input by the user for unlocking the electronic device so that it is possible to derive the correct lock password input by the user.

In accordance with an aspect of the present invention, an electronic device is provided. The electronic device includes a touch screen display and a processor configured to receive two or more touch inputs in a locked state of the electronic device and to release the locked state when the two or more touch inputs coincide with a pattern stored in advance. The processor is further configured to receive a first touch input through the display in the locked state of the electronic device, receive a second touch input through the display after receiving the first touch input, determine whether the second touch input is within a selected region with respect to one or more imaginary axes passing through a position of the first touch input, and determine whether the second touch input coincides at least partly with the stored pattern, based on whether the second touch input is within the selected region.

In accordance with another aspect of the present invention, a method for releasing the lock of an electronic device including a touch screen display is provided. The method includes receiving a first touch input through the display in a locked state of the electronic device, receiving a second touch input through the display after receiving the first touch input, determining whether the second touch input is within a selected region with respect to one or more imaginary axes passing through a position of the first touch input, determining whether the second touch input coincides at least partly with a pattern stored in advance, based on whether the second touch input is within the selected region; and controlling to release the locked state when the second touch input coincides with the stored pattern.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EMBODIMENTS OF THE PRESENT INVENTION

Figure 1:
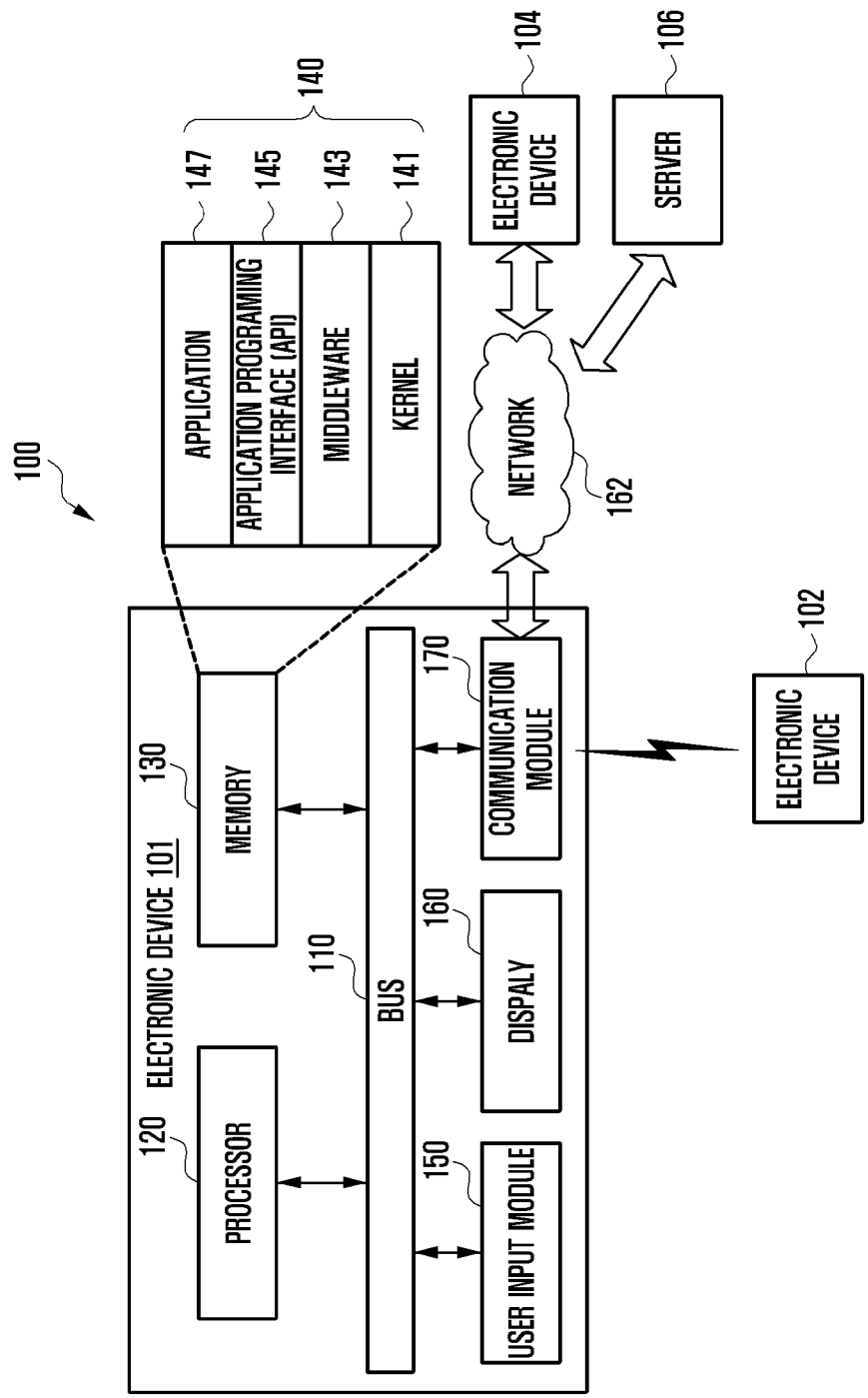
FIG. 1 is a block diagram of an electronic device within a network environment, according to an embodiment of the present invention.

Hereinafter, the present invention will be described with reference to the accompanying drawings. However, the present invention is not limited to a specific implementation form and it should be understood that the present invention includes all changes and/or equivalents and substitutes included in the spirit and scope of the present invention. In connection with descriptions of the drawings, similar components may be designated by the same reference numeral.

The terms "include" and "may include" which may be used in describing an embodiment of the present invention refer to the existence of a corresponding disclosed function, operation or component which can be used in an embodiment of the present invention and does not limit one or more additional functions, operations, or components.

As used herein, the expressions "or" and "at least one of A or/and B" include any or all of combinations of words listed together. For example, the expressions "A or B" and "at least A or/and B" may include A, may include B, or may include both A and B.

The expressions "1", "2", "first", or "second" used herein may modify various components of the various embodiments, but do not limit the corresponding components. For example, the above expressions do not limit the sequence and/or importance of the components. The expressions may be used for distinguishing one component from other components. For example, a first user device and a second user device indicate different user devices, although both of them are user devices. For example, without departing from the scope of the present invention, a first structural element may be referred to as a second structural element. Similarly, the second structural element also may be referred to as the first structural element.

When it is stated that a component (for example, a first component) is "coupled to" or "connected to" another component (for example, a second component), the first component may be directly coupled to the second component, or coupled to the second component through a new component (for example, a third component). In contrast, when it is stated that a component (for example, a first component) is "directly coupled to" or "directly connected to" another component (for example, a second component), a new component (for example, a third component) does not exist between the first component and the second component.

The terms used in describing various embodiments of the present invention are only examples for describing a specific embodiment but do not limit the various embodiments of the present invention. Singular forms are intended to include plural forms unless the context clearly indicates otherwise. Unless defined differently, all terms used herein, which include technical terminologies or scientific terminologies, have the same meaning as that understood by a person skilled in the art to which the present invention belongs. Such terms as those defined in a generally used dictionary are to be interpreted to have meanings equivalent to the contextual meanings in the relevant field of art, and are not to be interpreted to have ideal or excessively formal meanings unless clearly defined in the present description.

For example, the electronic device according to various embodiments of the present invention may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD), such as electronic glasses, electronic clothes, and electronic bracelet, an electronic necklace, an electronic appcessary, an electronic tattoo, and a smart watch.

According to some embodiments, the electronic device may be a smart home appliance. The smart home appliance may include at least one of a television (TV), a Digital Versatile Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device, etc.), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass, etc.), avionics, a security device, a head unit for a vehicle, an industrial or home robot, an Automatic Teller Machine (ATM), and a Point Of Sale (POS) device.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter, etc.) including a projection function.

The electronic device according to various embodiments of the present invention may be one or a combination of the above described various devices. Further, the electronic device according to various embodiments of the present invention may be a flexible device. It should be apparent to those skilled in the art that the electronic device according to various embodiments of the present invention is not limited to the above described devices.

Hereinafter, an electronic device according to various embodiments of the present invention will be described with reference to the accompanying drawings. The term "user" used in the description of the various embodiments may refer to a person who uses an electronic device or a device (for example, an artificial intelligence electronic device) which uses an electronic device.

FIG. 1 is a block diagram of an electronic device within a network environment, according to an embodiment of the present invention.

Referring to FIG. 1, a network environment 100 including an electronic device 101 is provided. The electronic device 101 includes a bus 110, a processor 120, a memory 130, a user input module 150, a display 160, and a communication module 170. According to an embodiment, the electronic device 101 may omit at least one of the components or further include another component.

The bus 110 is a circuit connecting the above described components (the processor 120, the memory 130, the user input module 150, the display 160, and the communication module 160) and transmitting communication (for example, a control message) between the above described components.

The processor 120 includes one or more of Central Processing Units (CPUs), Application Processors (APs) or communication processors (CPs). The processor 120 controls at least one component of the electronic device 101 and/or executes a calculation relating to communication or data processing.

The processor 120 is configured to receive a first touch input through the display in the locked state of the display, receive a second touch input through the display after receiving the first touch input, determine whether the second touch input is within a selected region with respect to one or more imaginary axes passing through a position of the first touch input, and determine whether the second touch input coincides with the stored pattern at least partly based on whether the second touch input is within the selected region.

The memory 130 includes volatile and/or non-volatile memory. The memory 130 stores commands or data relating to at least one component of the electronic device 101. The memory stores software and/or program 140. The program 140 includes a kernel 141, middleware 143, an Application Programming Interface (API) 145, and/or an application 147. At least one portion of the kernel 141, the middleware 143 and the API 145 may be defined as Operating System (OS).

The kernel 141 controls or manages system resources (for example, the bus 110, the processor 120, or the memory 130) used for executing an operation or function implemented by the remaining other program 140, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources described above of the electronic device 101 can be used, to the application 147.

The API 133 is an interface by which the application 134 can control a function provided by the kernel 131 or the middleware 132 and includes, for example, at least one interface or function (for example, command) for a file control, a window control, image processing, or a character control.

The user input module 150 is an interface to transmit a command or data input by a user or an external device to another component(s) of the electronic device 101. Further, the user input module 150 outputs the command or data received from the other component(s) of the electronic device 101 to the user or the external device.

The display 160 may include, for example, LCD (Liquid Crystal Display), LED (Light Emitting Diode), OLED (Organic Light Emitting Diode), or MEMS display (Micro Electro Mechanical System), or electronic paper display. The display 160 displays various contents (text, image, video, icon, or symbol, etc.) to a user. The display 160 may include a touch screen, and receive touch, gesture, approaching, or hovering input using a part of a body of the user.

The communication module 170 sets communication of the electronic device 101 and external device, such as a first external device 102, a second external device 104, or a server 106. For example, the communication interface 170 may be connected with the network 162 through wireless communication or wired communication and communicate with the second external device 104 or the server 106.

The wireless communication includes at least one of, for example, WiFi, BlueTooth (BT), Near Field Communication (NFC), a Global Positioning System (GPS), and cellular communication (for example, Long Term Evolution (LTE), LTE-Advanced (LTE-A), Code Division Multiple Access (CDMA), Wideband CDMA (WCDMA), Universal Mobile Telecommunication System (UMTS), Wireless Broadband (WiBro), or Global System for Mobile communication (GSM)).

The wired communication may include at least one of, for example, a Universal Serial Bus (USB), a High Definition Multimedia Interface (HDMI), Recommended Standard 232 (RS-232), and a Plain Old Telephone Service (POTS).

Each of the first external device 102 and the second external device 104 may be the same type of device as the electronic device 101 or a different type of device. The server 106 may include one or more group of servers. At least a portion of executions executed by the electronic device 101 may be performed by one or more electronic devices, such as the first external device 102, the second external device 104, or the server 106. When the electronic device 101 should perform a function or service automatically, the electronic device 101 may request performance of at least one function by the first external device 102, the second external device 104, or the server 106.

Figure 2:
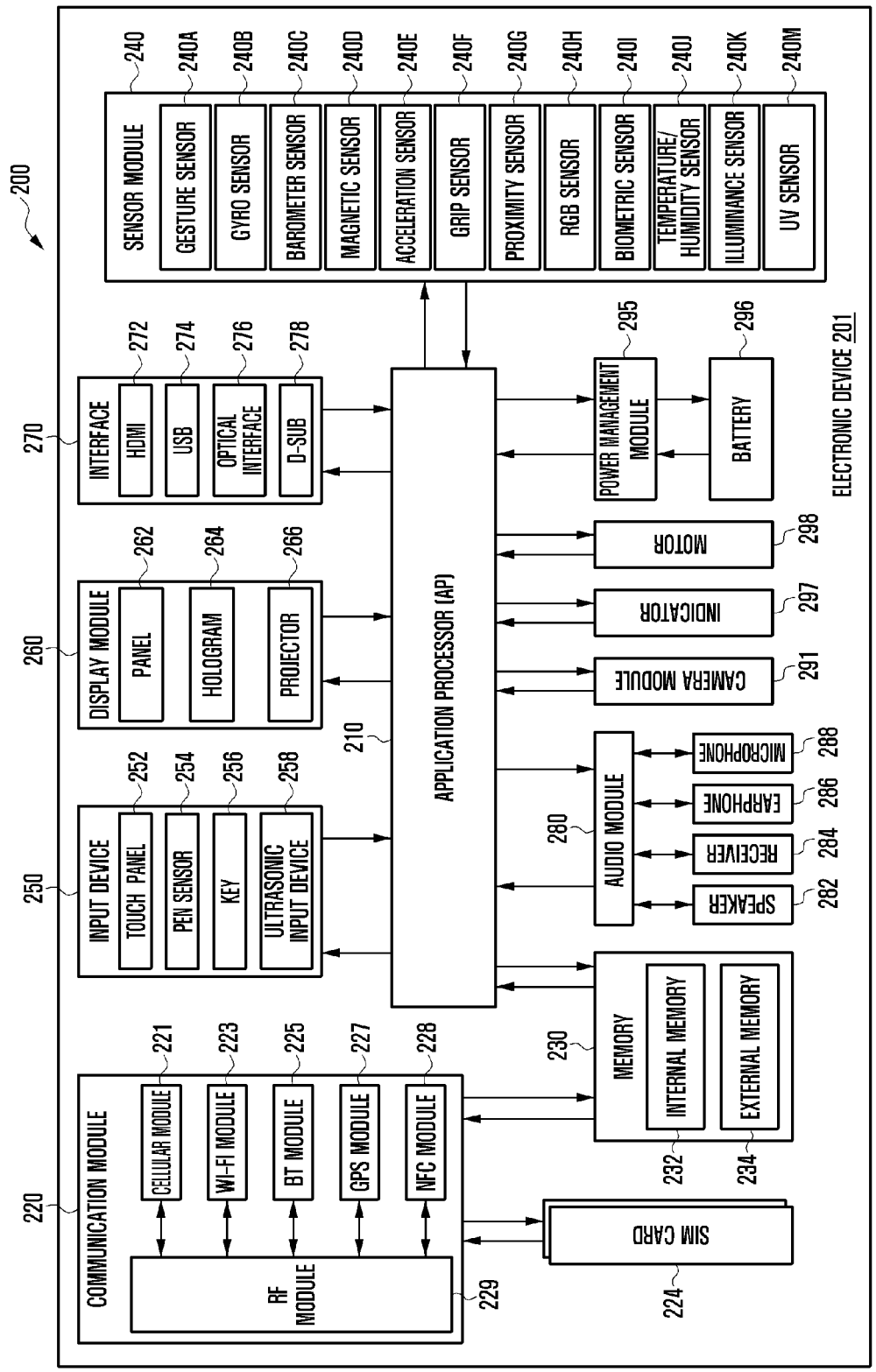
FIG. 2 is a block diagram of an electronic device, according to an embodiment of the present invention.

FIG. 2 is a block diagram of an electronic device, according to an embodiment of the present invention. Referring to FIG. 2 a block diagram of an electronic device 201 is provided. The electronic device 201 may configure a whole or a part of the electronic device 101 illustrated in FIG. 1. The electronic device 201 includes one or more Application Processors (APs) 210, a communication module 220, a Subscriber Identification Module (SIM) card 224, a memory 230, a sensor module 240, an input device 250, a display module 260, an interface 270, an audio module 280, a camera module 291, a power managing module 295, a battery 296, an indicator 297, and a motor 298.

The AP 210 operates an OS or an application program so as to control a plurality of hardware or software component elements connected to the AP 210 and execute various data processing and calculations including multimedia data. The AP 210 may be implemented by, for example, a System on Chip (SoC). The AP 210 may further include a Graphic Processing Unit (GPU) and/or image signal processor. The AP 210 may include at least a portion of the components of the electronic device 200 illustrated in FIG. 2 (for example, the cellular module 221). The AP 210 loads a command or data received from at least one of another component (for example, a non-volatile memory), and stores various data in the non-volatile memory.

The communication module 220 may include the same or similar components as the communication module 170 illustrated in FIG. 1. The communication module 220 includes a cellular module 221, a WiFi module 223, a BlueTooth (BT) module 225, a Global Positioning System (GPS) module 227, a Near Field Communication (NFC) module 228, and a Radio Frequency (RF) module 229.

The cellular module 221 provides a voice, a call, a video call, a Short Message Service (SMS), or Internet service through a communication network (for example, LTE, LTE-A, CDMA, WCDMA, UMTS, WiBro, GSM, etc.). Further, the cellular module 221 authenticates electronic devices within a communication network by using the SIM card 224. The cellular module 221 performs at least some of the functions which can be provided by the AP 210. For example, the cellular module 221 may perform at least some of the multimedia control functions. The cellular module 221 may include a Communication Processor (CP).

Further, the cellular module 221 may be implemented by an SoC. Although the components such as the cellular module 221 (for example, communication processor), the memory 230, and the power management module 295 are illustrated as components separate from the AP 210, the AP 210 may include at least some (for example, cellular module 221) of the aforementioned components.

Each of the WiFi module 223, the BT module 225, the GPS module 227, and the NFC module 228 may include a processor for processing data transmitted/received through the corresponding module. Although the cellular module 221, the WiFi module 223, the BT module 225, the GPS module 227, and the NFC module 228 are illustrated as blocks separate from each other in FIG. 2, at least some of the cellular module 221, the WiFi module 223, the BT module 225, the GPS module 227, and the NFC module 228 may be included in one Integrated Chip (IC) or one IC package. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented by one SoC.

The RF module 229 transmits/receives data, for example, an RF signal. The RF module 229 may include a transceiver, a Power Amp Module (PAM), a frequency filter, a Low Noise Amplifier (LNA), etc. Further, the RF module 229 may further include a component for transmitting/receiving electronic waves over a free air space in wireless communication, for example, a conductor, a conducting wire, etc. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module according to one embodiment.

The SIM card 224 is a card that may be inserted into a slot formed in a particular portion of the electronic device 201. The SIM card 224 includes unique identification information (for example, Integrated Circuit Card IDentifier (ICCID)) or subscriber information (for example, International Mobile Subscriber Identity (IMSI)).

The memory 230 includes an internal memory 232 or an external memory 234.

The internal memory 232 may include at least one of a volatile memory (for example, a Random Access Memory (RAM), a Dynamic RAM (DRAM), a Static RAM (SRAM), a Synchronous Dynamic RAM (SDRAM), etc.), and a non-volatile memory (for example, a Read Only Memory (ROM), a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, an NOR flash memory, etc.).

The internal memory 232 may be a Solid State Drive (SSD).

The external memory 234 may include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 201 through various interfaces. The electronic device 201 may further include a storage device (or storage medium), such as a hard drive.

The sensor module 240 measures a physical quantity or detects an operation state of the electronic device 201, and converts the measured or detected information to an electronic signal. The sensor module 240 may include at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G a color sensor 240H (for example, Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an InfraRed (IR) sensor, an iris sensor, a fingerprint sensor, etc. The sensor module 240 may further include a control circuit for controlling one or more sensors included in the sensor module 240.

The input device 250 includes a touch panel 252, a (digital) pen sensor 254, a key 256, and an ultrasonic input device 258.

The touch panel 252 recognizes a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented using a method identical or similar to a method of receiving a touch input of the user, or using a separate recognition sheet.

The key 256 may include a physical button, an optical key, or a key pad.

The ultrasonic input device 258 is a device which can detect an acoustic wave through an input means, such as by a microphone 288 of the electronic device 201, generating an ultrasonic signal to identify data and can perform wireless recognition.

The electronic device 201 may receive a user input from an external device, such as the first external device 102, the second external device 104, or the server 106 connected to the electronic device 201 by using the communication module 220.

The display module 260 includes a panel 262, a hologram device 264, and a projector 266.

The panel 262 may be a Liquid Crystal Display (LCD) or an Active Matrix Organic Light Emitting Diode (AM-OLED). The panel 262 may be implemented to be flexible, transparent, or wearable. The panel 262 may be configured by the touch panel 252 and one module.

The hologram device 264 shows a stereoscopic image in the air by using interference of light.

The projector 266 projects light on a screen to display an image. The screen may be located inside or outside the electronic device 201.

The display 260 may further include a control circuit for controlling the panel 262, the hologram device 264, and the projector 266.

The interface 270 includes a High-Definition Multimedia Interface (HDMI) 272, a Universal Serial Bus (USB) 274, an optical interface 276, and a D-subminiature (D-sub) 278.

The interface 270 may be included in the communication module 160 illustrated in FIG. 1. Additionally or alternatively, the interface 290 may include a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 may be included in the user input module 150 illustrated in FIG. 1. The audio module 280 processes sound information input or output through a speaker 282, a receiver 284, an earphone 286, and the microphone 288.

The camera module 291 is a device which can photograph a still image and a video. The camera module 291 may include one or more image sensors (for example, a front sensor or a back sensor), an Image Signal Processor (ISP) or a flash (for example, an LED or xenon lamp).

The power management module 295 manages power of the electronic device 201. The power management module 295 may include a Power Management Integrated Circuit (PMIC), a charger Integrated Circuit (IC), or a battery gauge.

The PMIC may be mounted to an integrated circuit or an SoC semiconductor. A charging method may be divided into wired and wireless methods. The charger IC charges a battery and prevents over voltage or over current from flowing from a charger. The charger IC may include a charger IC for at least one of the wired charging method and the wireless charging method. The wireless charging method may include, for example, a magnetic resonance method, a magnetic induction method, and an electromagnetic wave method, and additional circuits for wireless charging, for example, circuits such as a coil loop, a resonant circuit, a rectifier, etc. may be added.

The battery gauge measures a remaining quantity of the battery 296, a voltage, a current, or a temperature during charging. The battery 296 stores or generates electricity and supplies power to the electronic device 201 by using the stored or generated electricity. The battery 296 may include a rechargeable battery or a solar battery.

The indicator 297 shows particular statuses of the electronic device 201 or a part (for example, AP 210) of the electronic device 201, for example, a booting status, a message status, a charging status, etc. The motor 298 converts an electrical signal to a mechanical vibration. The electronic device 201 may include a processing unit (for example, GPU) for supporting a module TV. The processing unit for supporting the mobile TV may process media data according to a standard of Digital Multimedia Broadcasting (DMB), Digital Video Broadcasting (DVB), media flow, or the like.

Each of the components of the electronic device 201, according to various embodiments of the present invention, may be implemented by one or more components and the name of the corresponding component may vary depending on a type of the electronic device. The electronic device 201 may include at least one of the above described components, a few of the components may be omitted, or additional components may be further included. Also, some of the components of the electronic device 201 may be combined to form a single entity, and thus may equivalently execute functions of the corresponding components before being combined.

Figure 3:
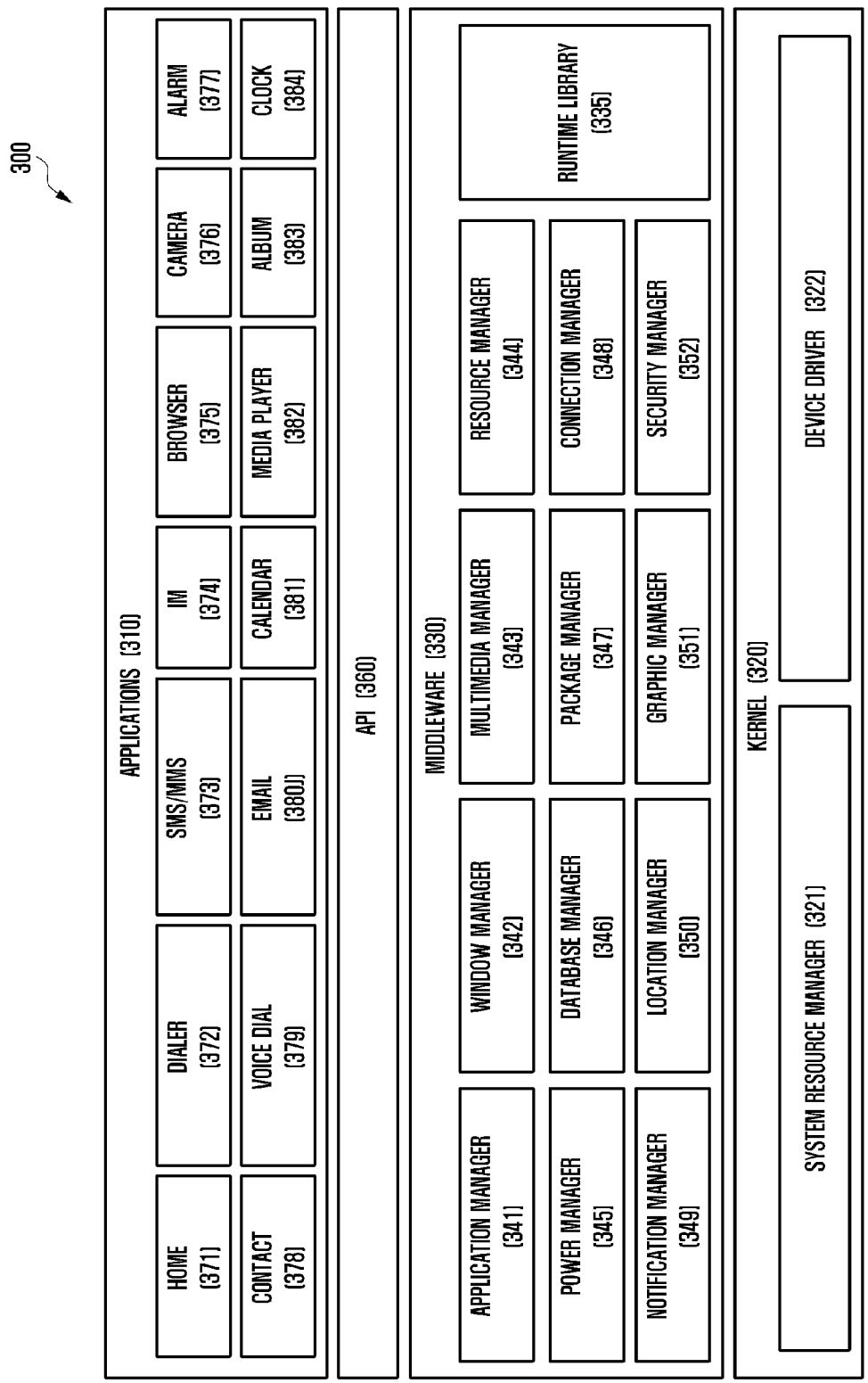
FIG. 3 is a block diagram of a programming module, according to an embodiment of the present invention.

FIG. 3 is a block diagram of a programming module, according to an embodiment of the present invention.

Referring to FIG. 3, programming module 300 is provided. The programming module 300 may be included, e.g. stored, in the electronic device 101, e.g. the memory 130, as illustrated in FIG. 1. At least a part of the programming module 300 may be configured by software, firmware, hardware, and/or combinations of two or more thereof. The programming module 300 may include an OS that is implemented in hardware, e.g., the hardware components of electronic device 201, to control resources related to an electronic device 101 and/or various applications 310, driven on the OS. For example, the OS may be Android™, iOS™, Windows™, Symbian™, Tizen™, Bada, etc. The programming module 300 includes a kernel 320, middleware 330, an API 360, and the applications 310.

The kernel 320, which may be like the kernel 141 illustrated in FIG. 1, includes a system resource manager 311 and/or a device driver 312.

The system resource manager 311 may include a process manager, a memory manager, and a file system manager. The system resource manager 311 controls, allocates, and/or collects system resources. The device driver 312 may include a display driver, a camera driver, a Bluetooth driver, a shared memory driver, a USB driver, a keypad driver, a WiFi driver, and an audio driver. Further, the device driver 312 may include an Inter-Process Communication (IPC) driver.

The middleware 330 may include a plurality of modules implemented in advance for providing functions commonly used by the applications 310. Further, the middleware 330 provides the functions through the API 360 such that the applications 310 can efficiently use restricted system resources within the electronic device 101. The middleware 330 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 is a library module that a compiler uses in order to add a new function through a programming language while one of the applications 310 is being executed. The runtime library 335 may perform an input/output, memory management, and/or a function for an arithmetic function.

The application manager 341 manages a life cycle of at least one of the applications 310. The window manager 342 can manage Graphical User Interface (GUI) resources used by a screen of the electronic device 101.

The multimedia manager 343 detects formats used for reproduction of various media files, and performs encoding and/or decoding of a media file by using a codec suitable for the corresponding format. The resource manager 344 manages resources, such as a source code, a memory, and a storage space of at least one of the applications 310.

The power manager 345 manages a battery and/or power, while operating together with a Basic Input/Output System (BIOS), and provides power information used for operation.

The database manager 346 manages generation, search, and/or change of a database to be used by at least one of the applications 370.

The package manager 347 manages installation and/or an update of an application distributed in a form of a package file.

The connection manager 348 manages wireless connectivity, such as Wi-Fi or Bluetooth.

The notification manager 349 displays or notifies of an event, such as an arrival message, a promise, a proximity notification, etc., in such a way that does not disturb a user of the electronic device 101.

The location manager 350 manages location information of the electronic device 101.

The graphic manager 351 manages a graphic effect which will be provided to a user, and/or a user interface related to the graphic effect.

The security manager 352 provides security functions used for system security and/or user authentication.

According to an embodiment, when an electronic device 101, has a telephone call function, the middleware 330 may further include a telephony manager for managing a voice and/or video communication function of the electronic device 101.

The middleware 330 may generate and use a new middleware module through various functional combinations of the aforementioned internal element modules. The middleware 330 can provide modules specialized according to types of OSs in order to provide differentiated functions. Further, the middleware 330 may dynamically remove some of the existing elements and/or add new elements. Accordingly, the middleware 330 may exclude some of the elements described, further include other elements, and/or substitute the elements with elements having a different name and performing a similar function.

The API 360, which may be similar to the API 145 illustrated in FIG. 1, is a set of API programming functions, and may be provided with a different configuration according to the OS. For example, in a case of Android™ or iOS™, one API set may be provided for each of platforms, and in a case of Tizen™, two or more API sets may be provided.

The applications 310, which may include an application similar to the application 134, may include a preloaded application and/or a third party application. The applications 310 may include a home application 371 a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present invention is not limited thereto, and the applications 310 may include any other similar and/or suitable application.

At least a part of the programming module 300 can be implemented by commands stored in computer-readable storage media. When the commands are executed by at least one processor, e.g. the processor 210, at least one processor can perform functions corresponding to the commands. The computer-readable storage media may be, for example, the memory 204. At least a part of the programming module 300 can be implemented, e.g. executed, by, for example, the processor 210. At least a part of the programming module 300 may include a module, a program, a routine, a set of instructions, and/or a process for performing at least one function.

The titles of the aforementioned elements of the programming module 300 may vary depending on the type of the OS.

According to an embodiment of the present invention, the programming module 300 may include at least one of the aforementioned elements and/or may further include other additional elements, and/or some of the aforementioned elements may be omitted. The operations performed by the programming module 300 and/or by other elements of the electronic device 101 may be processed through a sequential, parallel, repetitive, and/or heuristic method, and some of the operations may be omitted and/or other operations may be added.

Figure 4:
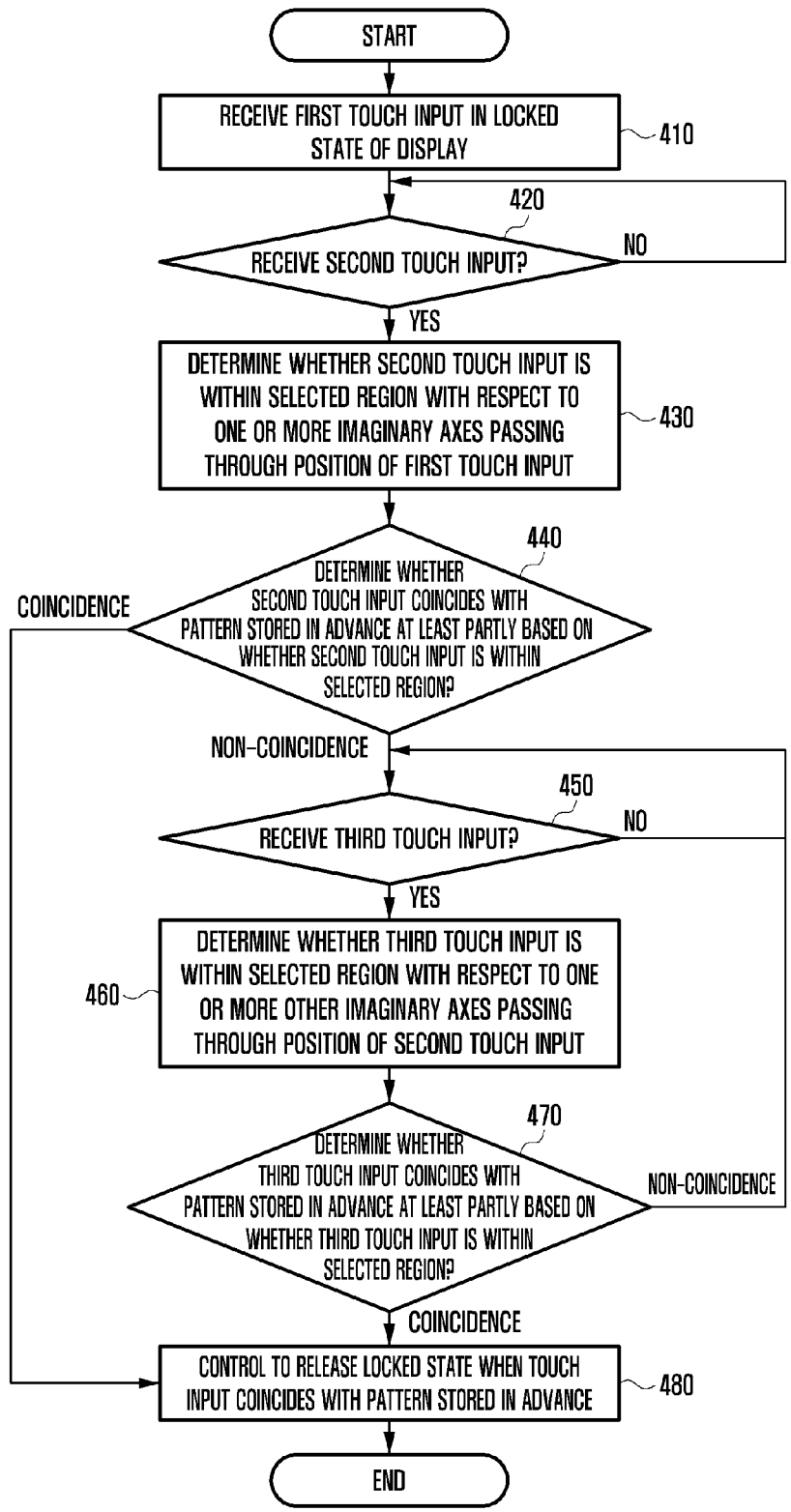
FIG. 4 is a flowchart of a method for releasing a lock of an electronic device, according to an embodiment of the present invention.

FIG. 4 is a flowchart of a method for releasing a lock of an electronic device, according to an embodiment of the present invention Referring to FIG. 4, a method of releasing a lock of an electronic device 101 is described. The electronic device 101, according to an embodiment of the present invention, includes a touch screen in which the user input module 150 and the display 160 are integrated. Hereinafter, the display 160 described below refers to a touch screen.

In step 410, the display 160 of the electronic device 101 receives a first touch input in a locked state. The locked state of the display 160 refers to a state in which the electronic device 101 is locked. For example, the display 160 may display some or no information in the locked state. The display 160 may display a lock screen. The lock screen may have various components, for example, a wallpapaer, execution screens and icons of applications, etc. The display 160 notifies the processor 120 that the first touch input has been received. The processor 120 recognizes a touch initially received in the locked state as the first touch input. The first touch input is a "reference touch", which is used as a reference when determining the angle of a second touch input that is subsequently input. The first touch input may be a "tap", which is an input such that any one point is touched on the display 160 and then the touch is released.

In step 420, the display 160 receives the second touch input. The display 160 notifies the processor 120 that the second touch input has been received. The processor 120 recognizes a touch received, after the first touch input, as the second touch input. The second touch input may be an "object touch", which is a touch input for determining a touch angle on the basis of a touch input. In the case of the second touch input, the object touch is for determining a touch angle on the basis of the first touch input. In this instance, the display 160 may display one or more imaginary axes passing through the position of the first touch input as a "coordinate axis guide". When coordinates of an input touch are changed, the coordinate axis guide may be changed on the basis of the changed coordinates of the input touch.

In step 430, the processor 120 determines whether the second touch input is within a selected region with respect to the one or more imaginary axes passing through the position of the first touch input. For example, the processor 120 determines whether the second touch input is within the selected region by determining whether an angle formed between an imaginary line connecting the first and second touch input and the imaginary axis is within a selected range. The processor 120 generates a reference axis, the number of axes, a direction of the axis, and a reference angle range on the basis of a direction type, which is set together when a password for releasing a lock is set by a user. Here, the "selected range" is the reference angle range.

The direction type may be any one of a horizontal two-direction type, a vertical two-direction type, a four-direction type, or an eight-direction type. The direction type may be set by the user when a password is set in the electronic device 101. The processor 120 determines at least one of the number of axes, the reference angle range, and the direction of the reference axis with respect to the imaginary axis, in response to one direction type set by the user among the vertical two-direction type, the horizontal two-direction type, the four-direction type, and the eight-direction type.

The display 160 displays the coordinate axis guide on the basis of the direction type. The coordinate axis guide will be described later with reference to FIG. 5.

The processor 120 assigns specific identification information corresponding to the selected region on the basis of the coordinate axis guide. For example, the specific identification information may be at least one of numbers, symbols, or alphabets. Alternatively, the specific identification information may be characters of a language that is the basis among the languages of individual countries. An example of assigning the specific identification information corresponding to the selected region will be described later with reference to FIG. 5.

The processor 120 may calculate the distance of the imaginary line connecting the first touch input and the second touch input and determine whether the distance is within a predetermined distance range, and thereby determine whether the second touch input is within the selected region.

In the following description, the imaginary line connecting the first touch input and the second touch input and an angle formed by the imaginary line and the imaginary axis are detected, but the processor 120 may alternatively, calculate the distance of the imaginary line connecting the first touch input and the second touch input and may thereby determine whether the second touch input is within the selected region.

If it is determined that the second touch input is not within the selected region, the processor 120 returns to step 420 to wait for another second touch input.

If it is determined that the second touch input is within the selected region, then in step 440, the processor 120 determines whether the second touch input coincides at least partly with a pattern stored in advance, based on whether the second touch input is within the selected region. That is, the processor 120 determines whether specific identification information corresponding to the selected region coincides with the pattern stored in advance. The stored pattern is stored in a memory 130 as a password for releasing a lock of the electronic device 101.

When the specific identification information coincides with the stored pattern, the processor 120 performs step 480 to release the locked state of the electronic device 101.

When the specific identification information does not coincide with the stored pattern, the processor 120 performs step 450.

Before performing step 450, the processor 120 sets the second touch input as the reference touch and thereby changes the reference touch from the first touch input to the second touch input. When coordinates of the reference touch are changed, the display 160 changes and displays the coordinate axis guide on the basis of the changed reference touch.

In step 450, the display 160 receives a third touch input. The display 160 notifies the processor 120 that the third touch input has been received. The processor 120 recognizes a touch received after the second touch input as the third touch input. The third touch input may be an object touch for determining a touch angle on the basis of the second touch input. In this instance, the display 160 displays one or more imaginary axes passing through the position of the second touch input as a "coordinate axis guide". Since the coordinates of the input touch are changed, the coordinate axis guide may be changed on the basis of the changed coordinates of the input touch. That is, the coordinate axis guide displayed in step 450 may be different from the coordinate axis guide displayed in step 420.

In step 460, the processor 120 may determine whether the third touch input is within a selected region with respect to one or more imaginary axes passing through the position of the second touch input. For example, the processor 120 determines whether an angle formed between an imaginary line connecting the second and third touch input and the imaginary axis is within a selected range, and thereby determines whether the third touch input is within the selected region.

If it is determined that the third touch input is not within the selected region, the processor 120 returns to step 450 to wait for another third input.

If it is determined that the third touch input is within the selected region, then in step 470, the processor 120 determines whether the third touch input coincides at least partly with the stored pattern, based on whether the third touch input is within the selected region. That is, the processor 120 determines whether specific identification information corresponding to the selected region coincides with the pattern stored in advance. In this instance, the specific identification information includes information detected in step 440 and information detected in step 470.

In step 480, when the specific identification information coincides with the stored pattern, the processor 120 controls to release the locked state of the electronic device 101. When the specific identification information does not coincide with the stored pattern, the processor 120 performs step 450 again. When the lock is released, the display 160 may display the home screen or an execution screen of an application of the electronic device 101. In general, the home screen may include icons (e.g., icons for applications) for executing various functions.

Figure 5:
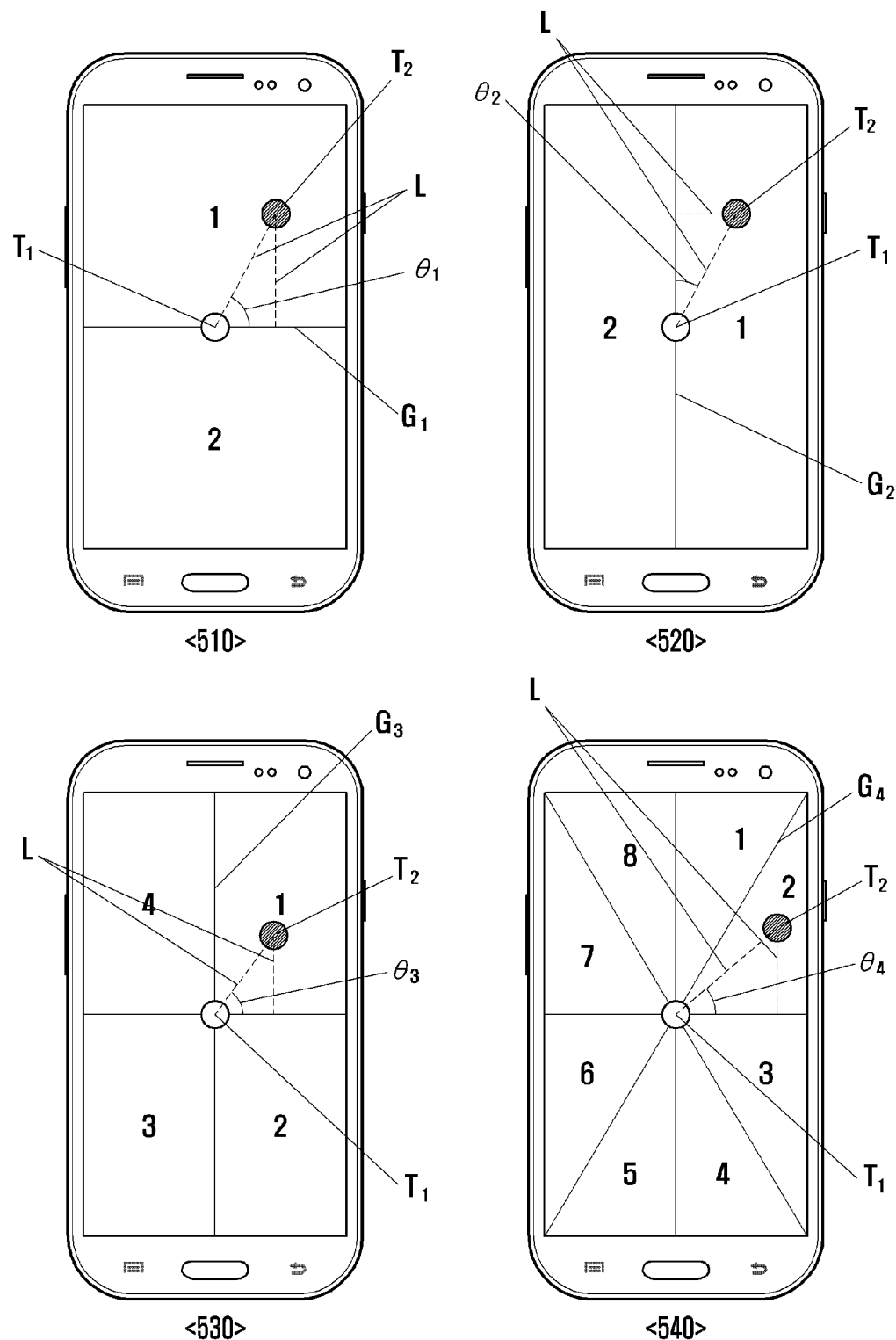
FIG. 5 illustrates an example of displaying a coordinate axis guide based on a direction type, according to an embodiment of the present invention.

FIG. 5 illustrates an example of displaying a coordinate axis guide based on a direction type, according to an embodiment of the present invention.

Referring to FIG. 5, an electronic device 101 illustrating various coordinate axis guides based on various direction types is provided. Reference numeral 510 illustrates a coordinate axis guide G1 based on a horizontal two-direction type. In the horizontal two-direction type, the corresponding direction may be divided into two directions, such as up and down. For example, in a two-dimensional coordinate system, the horizontal two-direction type is obtained by separating the corresponding region into an upper region, as an upper direction, and a lower region, as a lower direction, with respect to an x-axis. The display 160 displays an "x-axis" by the coordinate axis guide G1 in such a manner that one or more imaginary axes pass through the position of the first touch input T1. The processor 120 may normalize a touch region corresponding to the first touch input T1 as a circular region, and may determine the center coordinates of the circular region as coordinates of the first touch input T1. This may be equally applied to a second touch input which will be described below.

The display 160 displays an imaginary line L (represented by a dotted line) connecting the first touch input T1 and a second touch input T2, which is input after the first touch input. The processor 120 detects an angle 'θ1' formed between the imaginary line L and the imaginary axis, i.e., the coordinate axis guide G1. The angle θ1 in the horizontal two-direction type, in which the x-axis is set as the imaginary axis, may be an angle between 0° to 180°. The processor 120 determines whether the angle is within a selected range, and thereby determines whether the second touch input T2 is within the selected region. The processor 120 may assign specific identification information '1' to the upper region and specific identification information '2' to the lower region. The processor 120 determines whether the second touch input T2 belongs to the upper region or the lower region, and thereby detects '1' as the specific identification information corresponding to the second touch input T2. The display 160 displays the coordinate axis guide in a region adjacent to the first touch input T1 or the second touch input T2.

Reference numeral 520 illustrates a coordinate axis guide G2 based on the vertical two-direction type. In the vertical two-direction type, the corresponding direction may be divided into two directions such as right and left. For example, in the two-dimensional coordinate system, the vertical two-direction type is obtained by separating the corresponding region into a left region as a left direction and a right region as a right direction, with respect to the y-axis. The display 160 displays a "y-axis" by the coordinate axis guide G2 in such a manner that one or more imaginary axes pass through the position of the first touch input T1. The display 160 displays an imaginary line L (represented by a dotted line) connecting the first touch input T1 and the second touch input T2, which is input after the first touch input. The processor 120 detects an angle θ2 formed between the imaginary line L and the imaginary axis, i.e. the coordinate axis guide G2. The angle θ2 in the vertical two-direction type, in which the y-axis is set as the imaginary axis, may be an angle between 0° to 180°. The processor 120 may determine whether the angle is within a selected range, and may thereby determine whether the second touch input T2 is within the selected region. According to an embodiment, the processor 120 may assign specific identification information '1' to the right region and specific identification information '2' to the left region. The processor 120 determines whether the second touch input T2 belongs to the left region or the right region, and thereby detects '1' as the specific identification information corresponding to the second touch input T2.

Reference numeral 530 illustrates a coordinate axis guide G3 based on the four-direction type. In the four-direction type, the corresponding direction may be divided into four directions, such as up, down, left, and right. The four-direction type determines the corresponding direction by projecting the coordinates of a reference touch and the coordinates of a comparison touch on the x-axis and the y-axis, which are the two-dimensional coordinate system. The display 160 displays the x-axis and the y-axis by the coordinate axis guide G3 in such a manner that one or more imaginary axes pass through the position of the first touch input T1. The display 160 displays the imaginary line L (represented by a dotted line) connecting the first touch input T1 and the second touch input T2, which is input after the first touch input. The processor 120 detects an angle θ3 formed between the imaginary line L and the imaginary axis, i.e. the coordinate axis guide G3. The angle θ3 in the four-direction type, in which the x-axis and the y-axis are set as the imaginary axes, may be an angle between 0° to 90°. The processor 120 determines whether the angle is within a selected range, and thereby determines whether the second touch input T2 is within the selected region.

As shown by reference number 530 in FIG. 5, the two-dimensional plane may be divided into four regions by the x-axis and the y-axis, and the four regions are regions which can be recognized by an object touch. The four regions may be divided into a first quadrant, a second quadrant, a third quadrant, and a fourth quadrant in the clockwise direction. The processor 120 may assign specific identification information '1' to the first quadrant, specific identification information '2' to the second quadrant, specific identification information '3' to the third quadrant, and specific identification information '4' to the fourth quadrant. The processor 120 determines which quadrant the second touch input T2 belongs to among the first to fourth quadrants, and thereby detects '1' as a character corresponding to the specific identification information corresponding to the second touch input T2. When the coordinates of the second touch input T2 belong to the second quadrant, the processor 120 detects '2' as the character corresponding to the second touch input T2. Alternatively, when the coordinates of the second touch input T2 belong to the third quadrant, the processor 120 detects '3' as the character corresponding to the second touch input T2. Alternatively, when the coordinates of the second touch input T2 belong to the fourth quadrant, the processor 120 detects '4' as the character corresponding to the second touch input T2.

Reference numeral 540 illustrates a coordinate axis guide G4 based on the eight-direction type. In the eight-direction type, the corresponding direction may be divided into eight directions, such as up, down, left, right, and diagonal. The eight-direction type determines the corresponding direction by projecting the coordinates of a reference touch and the coordinates of a comparison touch on the coordinate system that further includes two diagonal axes crossing between the x-axis and the y-axis, in addition to the x-axis and the y-axis, which are the two-dimensional coordinate system. The display 160 displays four reference axes by the coordinate axis guide G4 in such a manner that one or more imaginary axes pass through the position of the first touch input T1. The display 160 detects the imaginary line L (represented by a dotted line) connecting the first touch input T1 and the second touch input T2, which is input after the first touch input. The processor 120 detects an angle θ4 formed between the imaginary line 'L' and the imaginary axis, i.e. the coordinate axis guide G4. The angle θ4 in the eight-direction type may be an angle between 0° to 45°. The processor 120 determines whether the angle is within a selected range, and thereby determines whether the second touch input T2 is within the selected region.

As shown reference number 540 in FIG. 5, the two-dimensional plane may be equally divided into eight regions by the four axes, and the eight regions are regions which can be recognized by the object touch. The eight regions are divided into first to eighth quadrants in the clockwise direction. The processor 120 may assign specific identification information '1' to the first quadrant, specific identification information '2' to the second quadrant, specific identification information '3' to the third quadrant, specific identification information '4' to the fourth quadrant, specific identification information '5' to the fifth quadrant, specific identification information '6' to the sixth quadrant, specific identification information '7' to the seventh quadrant, and specific identification information '8' to the eighth quadrant. The processor 120 determines which quadrant the second touch input T2 belongs to among the first to eighth quadrants, and thereby detects the specific identification information corresponding to the second touch input T2.

For example, when the coordinates of the second touch input T2 belong to the first quadrant, the processor 120 detects '1' as the specific identification information corresponding to the direction. When the coordinates of the second touch input T2 belong to the second quadrant, the processor 120 detects '2' as the specific identification information corresponding to the direction. Alternatively, when the coordinates of the second touch input T2 belong to the third quadrant, the processor 120 detects '3' as the specific identification information corresponding to the direction.

Alternatively, when the coordinates of the second touch input T2 belong to the fourth quadrant, the processor 120 detects '4' as the specific identification information corresponding to the direction. Alternatively, when the coordinates of the second touch input T2 belong to the fifth quadrant, the processor 120 detects '5' as the specific identification information corresponding to the direction. Alternatively, when the coordinates of the second touch input T2 belong to the sixth quadrant, the processor 120 detects '6' as the specific identification information corresponding to the direction. Alternatively, when the coordinates of the second touch input T2 belong to the seventh quadrant, the processor 120 detects '7' as the specific identification information corresponding to the direction. Alternatively, when the coordinates of the second touch input T2 belong to the eighth quadrant, the processor 120 detects '8' as the specific identification information corresponding to the direction.

As above, in FIG. 5, an example of assigning a certain number as the specific identification information has been described, but at least one of symbols, alphabets, and characters of the language that is the basis among the languages of individual countries may be set as the specific identification information.

Hereinafter, in the following drawings, an example of detecting an angle will be described. Here, a first touch input that is initially detected is represented by reference numeral 'T1', a second touch input that is detected after 'T1' is represented by reference numeral 'T2', a third touch input that is detected after 'T2' is represented by reference numeral 'T3', and a fourth touch input that is detected after 'T3' is represented by reference numeral 'T4'. This is to separate the touch inputs for the convenience of description, and does not limit the scope of the invention.

Figure 6:
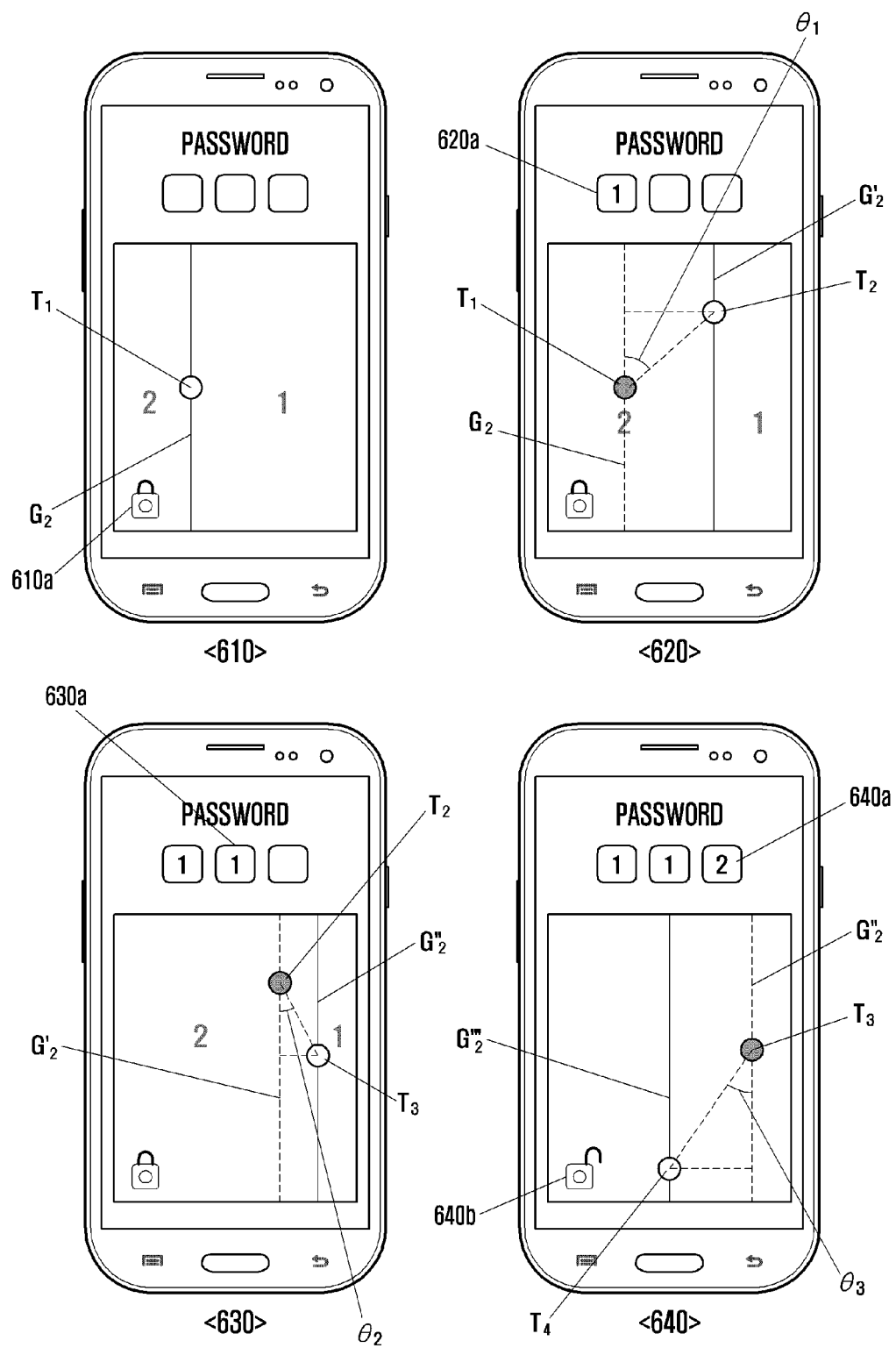
FIG. 6 illustrates an example of detecting an angle in accordance with a vertical two-direction type, according to an embodiment of the present invention.

FIG. 6 illustrates an example of detecting an angle in accordance with a vertical two-direction type, according to an embodiment of the present invention.

Referring to FIG. 6, an electronic device 101 illustrating a coordinate axis guide based on a vertical two-direction type is provided. Reference numeral 610 illustrates an example of setting a first touch input T1, which is initially detected in the display 160 on a lock screen, as a reference touch. In this instance, the display 160 a coordinate axis guide G2 for the first touch input T1 is based on the vertical two-direction type. The display 160 represents the locked state of the electronic device 101 by a locked padlock-shaped icon 610a. The processor 120 assigns specific identification information '1' to the right region on the basis of the coordinate axis guide G2, and specific identification information '2' to the left region. The display 160 displays the coordinate axis guide G2, and thereby indicates that the left region or the right region is a region that can be recognized by an object touch with respect to the coordinate axis guide G2. A user may touch the left side or the right side of the display 160, which is the region recognized by the object touch. The processor 120 may normalize a touch region corresponding to the first touch input T1 as a circular region, and may determine that the center coordinates of the circular region are coordinates of the first touch input. This may be equally applied to a second touch input which will be described below.

In FIG. 6, the assigned specific identification information is displayed, but alternatively, may not be displayed. Alternatively, the display 160 may not display the assigned specific identification information when releasing a lock, and may display the assigned specific identification information when setting a lock.

Reference numeral 620 illustrates a case in which the detected second touch input T2 is set as the object touch in the display 160 when the user touches the right region. The processor 120 determines whether the object touch T2 is within a selected region with respect to an imaginary axis, i,e, the coordinate axis guide G2 passing through the position of the reference touch T1. The processor 120 determines whether an angle θ1 formed between an imaginary line (represented by a dotted line), connecting the reference touch T1 and the object touch T2, and the imaginary axis, i.e., the coordinate axis guide G2 is within a selected range, and thereby determines whether the object touch T2 is within the selected region. In the reference numeral 620, the processor 120 detects specific identification information corresponding to the angle θ1 as '1'. The display 160 displays the detected specific identification information '1' as shown by reference numeral 620a. The processor 120 determines whether the object touch T2 coincides at least partly, with a pattern stored in advance, based on whether the object touch T2 is within the selected region. When the object touch T2 does not coincide with the stored pattern, the processor 120 may wait for the following touch input of a user. In this case, the processor 120 sets the object touch T2 as the reference touch. When the object touch T2 is set as the reference touch, the display 160 may change and display the coordinate axis guide G2' as the coordinates of the reference touch are changed to T2.

Referring to the reference numeral 620, it can be seen that the coordinate axis guide is changed from G2 to G2' as the coordinates of the reference touch are changed from T1 to T2. When the reference touch is changed, the processor 120 also changes the coordinate axis guide according to the changed coordinates of the reference touch. As shown in the reference numeral 620, the display 160 displays the changed coordinate axis guide G2'.

Reference numeral 630 illustrates a case in which a detected touch T3 is set as an object touch in the display 160 when the user touches the right region. The processor 120 determines whether the object touch T3 is within a selected region with respect to an imaginary axis, i.e., the coordinate axis guide G2' passing through the position of the reference touch T2. The processor 120 determines whether an angle θ2 formed between an imaginary line, connecting the reference touch T2 and the object touch T3 and the imaginary axis, i.e., the coordinate axis guide G2', is within a selected range, and thereby determines whether the object touch T3 is within the selected region. In the reference numeral 630, the processor 120 detects specific identification information corresponding to the angle θ2 as '1'. The display 160 displays the detected specific identification information '1' as shown by reference numeral 630a. The processor 120 determines whether the object touch T3 coincides with a pattern stored in advance, at least partly based on whether the object touch T3 is within the selected region. When the object touch T3 does not coincide with the stored pattern, the processor 120 may wait for the following touch input of a user. In this case, the processor 120 sets the object touch T3 as the reference touch. When the object touch T3 is set as the reference touch, the display 160 changes and displays the coordinate axis guide into G2", as the coordinates of the reference touch are changed to T3.

Referring to the reference numeral 630, it can be seen that the coordinate axis guide is changed from G2' to G2", as the coordinates of the reference touch are changed from T2 to T3. When the reference touch is changed, the processor 120 also changes the coordinate axis guide according to the changed coordinates of the reference touch. As shown in the reference numeral 630, the display 160 displays the changed coordinate axis guide G2".

The reference numeral 640 illustrates a case in which a detected touch input T4 is set as an object touch in the display 160 when the user touches the left region with respect to the coordinate axis guide G2". The processor 120 determines whether the object touch T4 is within a selected region with respect to an imaginary axis, i.e., the coordinate axis guide G2" passing through the position of the reference touch T3. The processor 120 may determine whether an angle θ3 formed between an imaginary line, connecting the reference touch T3 and the object touch T4, and the imaginary axis, i.e., the coordinate axis guide G2" is within a selected range, and thereby determines whether the object touch T4 is within the selected region. In the reference numeral 640, the processor 120 detects specific identification information corresponding to the angle θ3 as '2'. The display 160 displays the detected specific identification information '2' as shown by reference numeral 640*a*. The processor 120 determines whether the object touch T4 coincides at least partly, with a pattern stored in advance, based on whether the object touch T4 is within the selected region. When the object touch T4 coincides with the stored pattern, the display 160 displays an unlocked padlock-shaped icon 640*b*, and thereby indicates that the locked state of the electronic device 101 is released. When the locked state of the electronic device 101 is released by the processor 120, the display 160 may display the home screen or the execution screen of an application.

Figure 7:
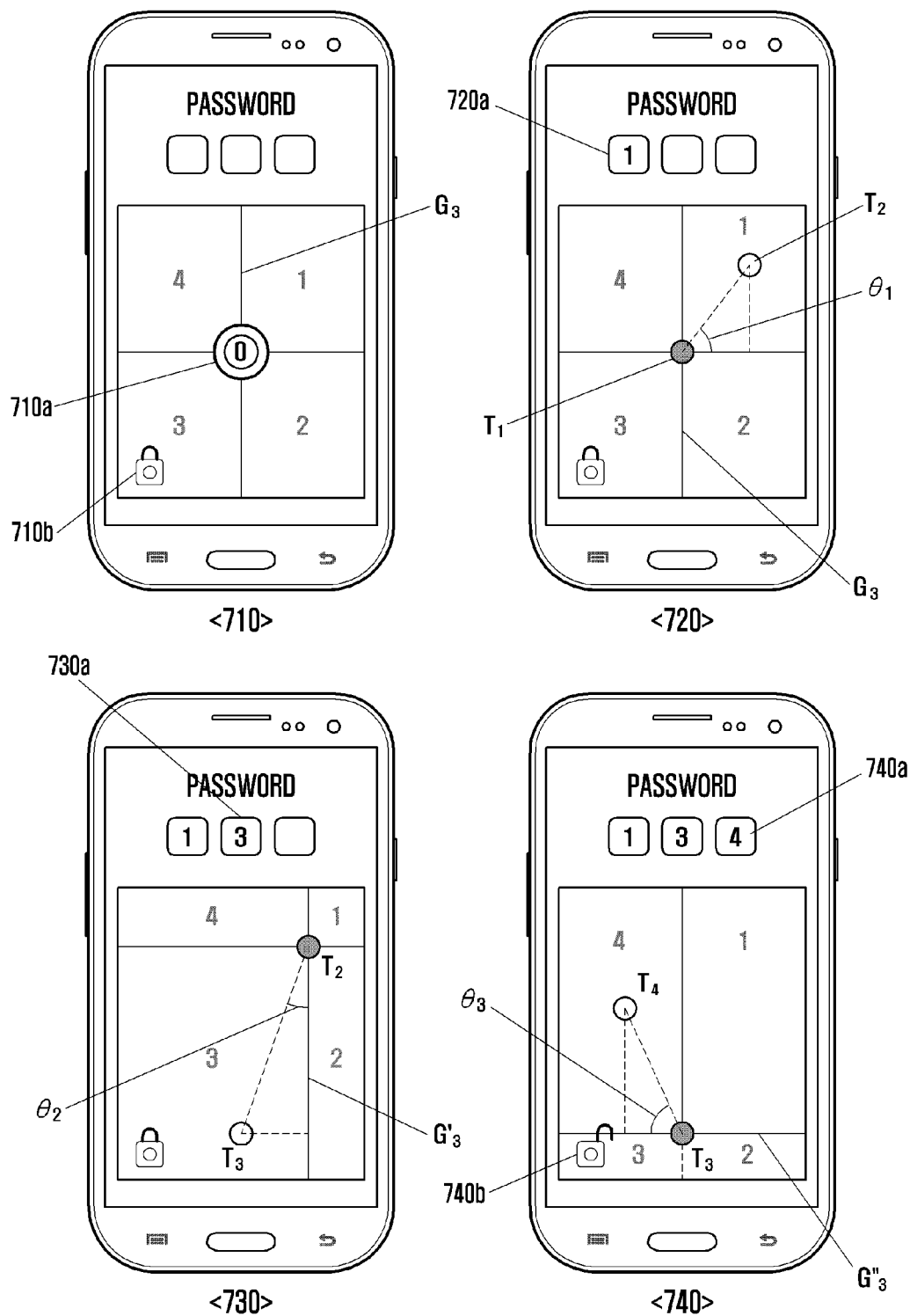
FIG. 7 illustrates an example of detecting an angle in accordance with a four-direction type, according to an embodiment of the present invention.

FIG. 7 illustrates an example of detecting an angle in accordance with a four-direction type, according to an embodiment of the present invention.

Referring to FIG. 7, an electronic device 101 illustrating a coordinate axis guide based on a four-direction type is provided. Reference numeral 710 illustrates a coordinate axis guide G3 associated with the four-direction type. The display 160 displays a locked padlock-shaped icon 710*b* which represented the locked state of the electronic device 101. The processor 120 assigns specific identification information to each quadrant based on the coordinate axis guide G3 associated with the four-direction type. For example, the processor 120 may assign specific identification information '1' to the first quadrant, specific identification information '2' to the second quadrant, specific identification information '3' to the third quadrant, and specific identification information '4' to the fourth quadrant. However, the processor 120 may assign specific identification information '0' preparing for a case in which an object touch is input within the reference numeral 710*a*, which is the center of each quadrant.

For example, when the reference touch and the object touch are set within the reference numeral 710*a*, the processor 120 considers the corresponding touch to be a touch without direction. In this case, the processor 120 assigns specific identification information in order to distinguish the touch without direction from other touches with direction. When the coordinates of the object touch are within a reference distance from the coordinates of the reference touch, the processor 120 assigns the specific identification information.

Reference numeral 720 illustrates a coordinate axis guide G3 associated with the four-direction type. In this case, a first touch input T1, which is initially detected, is set as a reference touch in the display 160 in a lock screen, and a second touch input T2 is set as an object touch. The display 160 displays an imaginary axis, i.e. the coordinate axis guide G3, passing through the reference touch T1. The processor 120 determines whether the object touch T2 is within a selected region with respect to the imaginary axis, i.e. the coordinate axis guide G3, passing through the position of the reference touch T1. The processor 120 determines whether an angle θ1 formed between an imaginary line (represented by a dotted line), connecting the reference touch T1 and the object touch T2, and the imaginary axis, i.e., the coordinate axis guide G3 is within a selected range, and thereby determines whether the object touch T2 is within the selected region. In the reference numeral 720, the processor 120 detects specific identification information corresponding to the angle θ1 as '1'. The display 160 displays the detected specific identification information '1' as shown by reference numeral 720*a*. The 120 determines whether the object touch T2 coincides at least partly with a pattern stored in advance, based on whether the object touch T2 is within the selected region. When the object touch T2 does not coincide with the stored pattern, the processor 120 may wait for the following touch input of a user. In this case, the processor 120 sets the object touch T2 as the reference touch. When the object touch T2 is set as the reference touch, the processor 120 changes the coordinate axis guide to G3', as the coordinates of the reference touch are changed to T2.

Reference numeral 730 illustrates a case in which a detected second touch input T3 is set as the object touch in the display 160 when the user touches the third quadrant with respect to the coordinate axis guide G3'. The processor 120 determines whether the object touch T3 is within a selected region with respect to the imaginary axis, i.e. the coordinate axis guide G3', passing through the position of the reference touch T2. The processor 120 may determine whether an angle θ2 formed between an imaginary line (represented by a dotted line), connecting the reference touch T2 and the object touch T3, and the imaginary axis, i.e. the coordinate axis guide G3' is within a selected range, and thereby determines whether the object touch T3 is within the selected region. In the reference numeral 730, the processor 120 detects specific identification information corresponding to the angle θ2 as '3'. The display 160 displays the detected specific identification information '3' as shown by reference numeral 730*a*. The processor 120 determines whether the object touch T3 coincides at least partly, with a pattern stored in advance, based on whether the object touch T3 is within the selected region. When the object touch T3 does not coincide with the stored pattern, the processor 120 may wait for the following touch input of a user. In this case, the processor 120 sets the object touch T3 as the reference touch. When the object touch T3 is set as the reference touch, the display 160 changes and displays the coordinate axis guide to G3", as the coordinates of the reference touch are changed to T3. Referring to the reference numeral 730, it can be seen that the coordinate axis guide is changed from G3 to G3', as the coordinates of the reference touch are changed from T2 to T3. When the reference touch is changed, the processor 120 also changes the coordinate axis guide according to the changed coordinates of the reference touch. As shown in the reference numeral 730, the display 160 displays the changed coordinate axis guide G3'.

Reference numeral 740 illustrates a case in which a detected fourth touch input T4 is set as an object touch in the display 160 when the user touches the fourth quadrant with respect to the coordinate axis guide G3". The processor 120 determines whether the object touch T4 is within a selected region with respect to an imaginary axis, i.e., the coordinate axis guide G3", passing through the position of the reference touch T3. The processor 120 determines whether an angle θ3 formed between an imaginary line (represented by a dotted line), connecting the reference touch T3 and the object touch T4, and the imaginary axis, i.e., the coordinate axis guide G3" is within a selected range, and thereby determines whether the object touch T4 is within the selected region. In the reference numeral 740, the processor 120 detects specific identification information corresponding to the angle θ3 as '4'. The display 160 displays the detected specific identification information '4' as shown by reference numeral 740a. The processor 120 determines whether the object touch T4 coincides at least partly with a pattern stored in advance, based on whether the object touch T4 is within the selected region. When the object touch T4 coincides with the stored pattern, the display 160 displays an unlocked padlock-shaped icon 740b, and thereby indicates that the locked state of the electronic device 101 is released. When the locked state of the electronic device 101 is released by the processor 120, the display 160 may display a home screen or an execution screen of an application.

The touch, according to the present invention, may be a 'single-touch' having a single-touch point or a 'multi-touch' having a plurality of touch points. Hereinafter, an example of releasing a lock using the single-touch and the multi-touch will be described with reference to FIGS. 8 to 10.

Figure 8A:
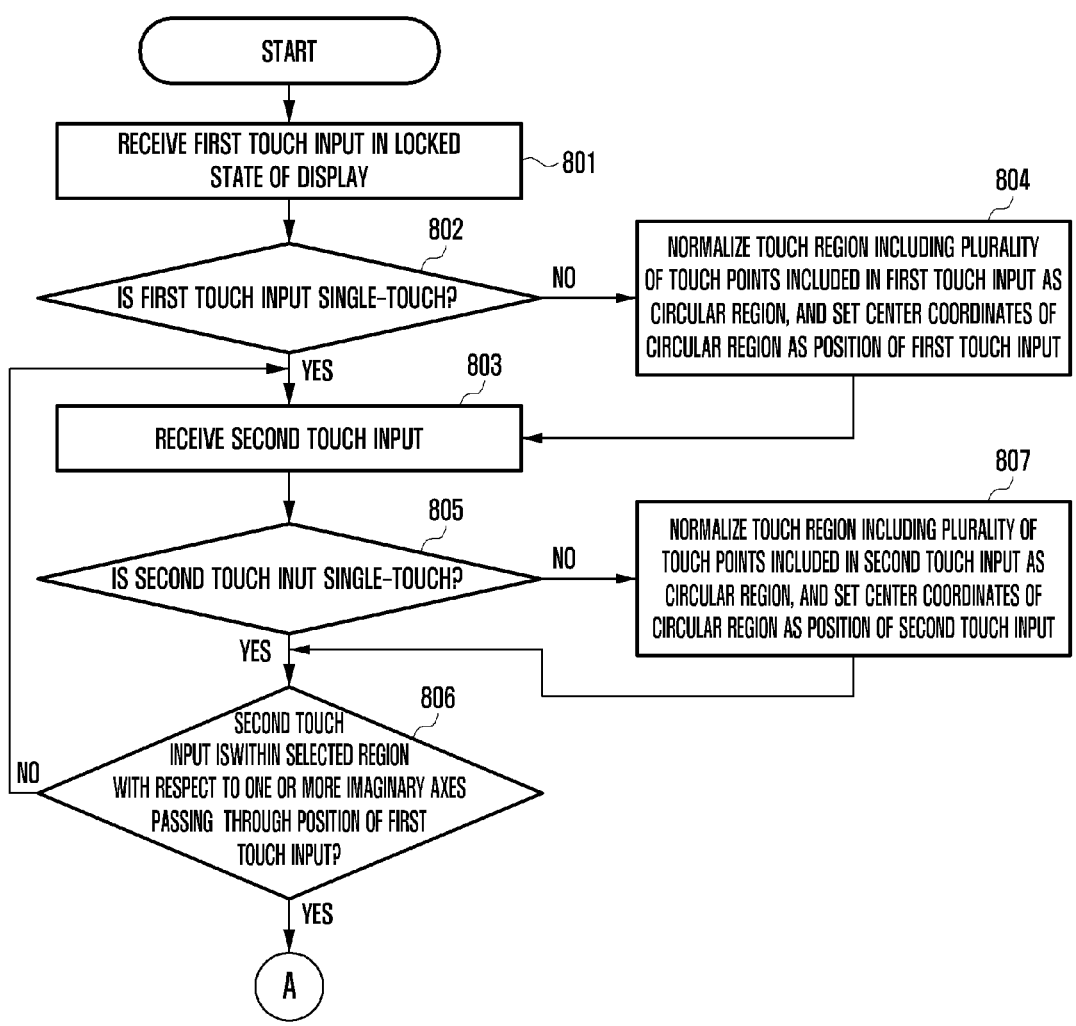
FIGS. 8A and 8B are flowcharts of a method for releasing a lock using a single-touch and a multi-touch, according to an embodiment of the present invention.
Figure 8B:
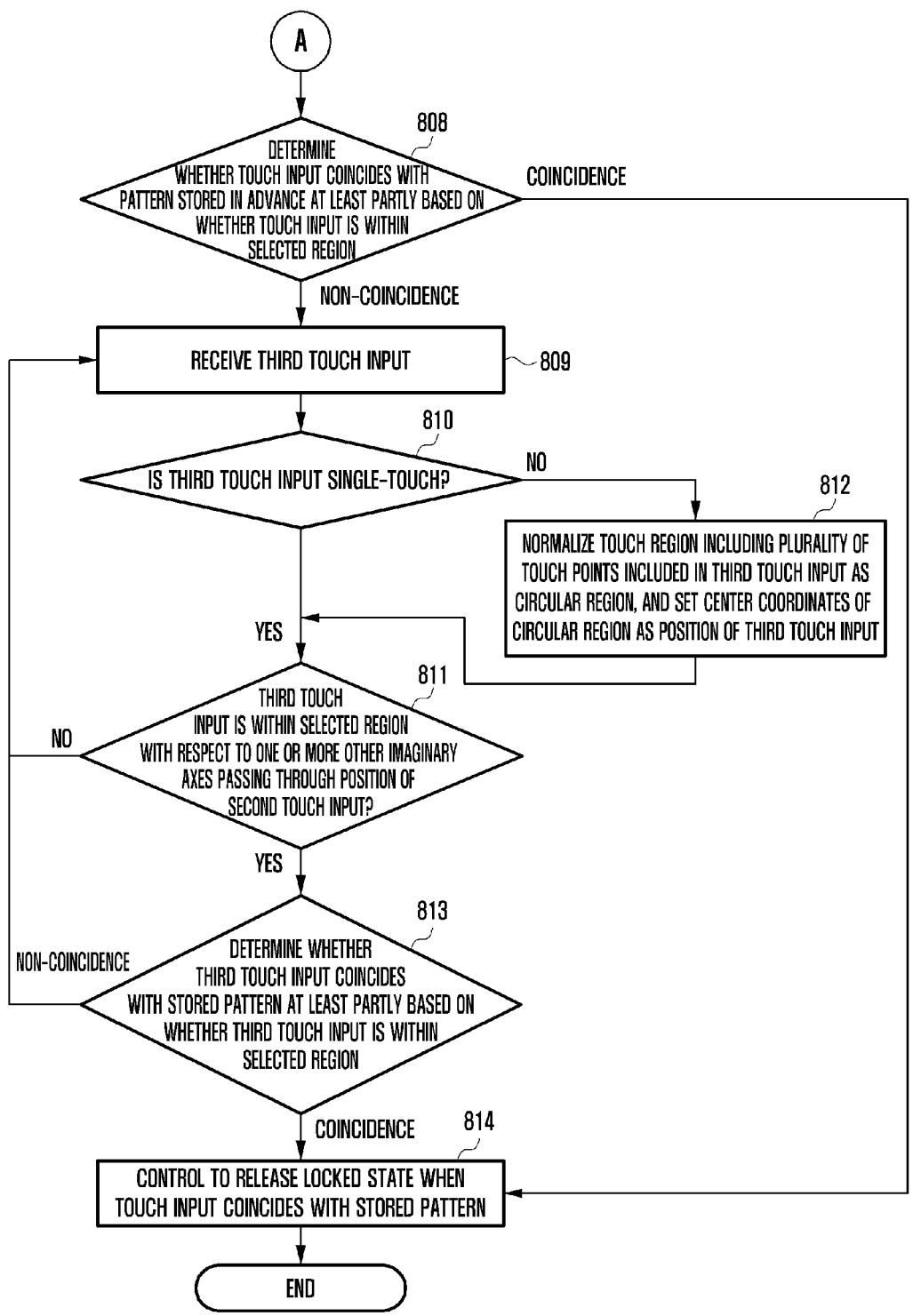

FIGS. 8A and 8B are flowcharts of a method for releasing a lock using a single-touch and a multi-touch, according to an embodiment of the present invention. The flowchart of FIG. 8 is similar to the flowchart of FIG. 4, and thus any redundant description will be briefly described.

Referring to FIG. 8, a method of releasing a lock of an electronic device 101 using a single-touch and a multi-touch input is described. In step 801, the display 160 receives a first touch input in a locked state. The display 160 notifies the processor 120 that the first touch input has been received. The processor 120 recognizes a touch initially received in the locked state as the first touch input. The first touch input is a "reference touch", which is a reference when determining an angle of a second touch input which is subsequently input.

In step 802, the processor 120 determines whether the first touch input is a single-touch. For example, the processor 120 determines the first touch input to be the single-touch when the first touch input has a single touch point, and performs step 803. Alternatively, the processor 120 determines the first touch input to be the multi-touch when the first touch input has a plurality of touch points, and performs step 804.

The processor 120 may set specific identification information different from each other with respect to the single-touch and the multi-touch. For example, the processor 120 may assign "numbers" to the single-touch, and "alphabets" to the multi-touch. The processor 120 may assign specific identification information in response to the number of the multi-touches. For example, the processor 120 may: assign specific identification 'A' when the number of the multi-touches is 2; assign specific identification information 'B' when the number of the multi-touches is 3; and assign specific identification information 'C' when the number of the multi-touches is 4. The processor 120 detects the specific identification information assigned to the number of the detected touches. In this case, the processor 120 detects the number of the touch points included in the multi-touch; combines specific identification information set in advance in response to the number of the touch points as additional information; and determines whether the corresponding touch input coincides with the stored pattern based on the selected region and a part of the combined information.

In step 804, the processor 120 normalizes a touch region including a plurality of touch points included in the first touch input as a circular region, and set the center coordinates of the circular region as the position of the first touch input. That is, the processor 120 sets a single circular region including all touch points, and sets the center coordinates of the circular region as the position of the first touch input. When step 804 is completed, the processor 120 performs step 803.

In step 803, the display 160 receives a second touch input after receiving the first touch input. The display 160 notifies the processor 120 that the second touch input has been received. The processor 120 recognizes a touch received after the first touch input as the second touch input. The second touch input is an "object touch" for determining a touch angle on the basis of the first touch input. In this instance, the display 160 displays one or more imaginary axes passing through the position of the first touch input as a "coordinate axis guide".

In step 805, the processor 120 determines whether the second touch input is the single-touch. For example, the processor 120 determines the second touch input to be the single-touch when the second touch input has a single touch point, and performs step 806. Alternatively, the processor 120 determines the second touch input to be the multi-touch when the second touch input has a plurality of touch points, and performs step 807.

In step 807, the processor 120 normalizes a touch region including a plurality of touch points included in the second touch input as a circular region, and sets the center coordinates of the circular region as the position of the second touch input. When step 807 is completed, the processor 120 performs step 806.

In step 806, the processor 120 determines whether the second touch input is within a selected region with respect to one or more imaginary axes passing through the position of the first touch input.

If it is determined that the second touch input is not within the selected region, the processor 120 returns to step 803 to wait for another second touch input.

If it is determined that the second touch input is within the selected region, then in step 808, the processor 120 determines whether the second touch input coincides at least partly with the stored pattern, based on whether the second touch input is within the selected region. The processor 120 determines whether specific identification information corresponding to the selected region coincides with a pattern stored in advance. When the specific identification information coincides with the stored pattern, the processor 120 performs step 814 to release the locked state. When the specific identification information does not coincide with the stored pattern, the processor 120 performs step 809.

Before performing step 809, the processor 120 sets the second touch input as the reference touch, and thereby changes the reference touch. When coordinates of the reference touch are changed, the display 160 changes and displays the coordinate axis guide on the basis of the changed reference touch.

In step 809, the display 160 receives a third touch input. The display 160 notifies the processor 120 that the third touch input has been received. The processor 120 recognizes a touch received after the second touch input as the third touch input. The third touch input may be an "object touch" for determining a touch angle on the basis of the second touch input.

In step 810, the processor 120 determines whether the third touch input is a single-touch. For example, the processor 120 determines the third touch input to be the single-touch when the third touch input has a single touch point, and performs step 811. Alternatively, the processor 120 determines the third touch input to be the multi-touch when the third touch input has a plurality of touch points, and performs step 812.

In step 812, the processor 120 normalizes a touch region including a plurality of touch points included in the third touch input as a circular region, and sets the center coordinates of the circular region as the position of the third touch input. When step 812 is completed, the processor 120 performs step 811.

If it is determined that the third touch input is not within the selected region, the processor 120 returns to step 809 to wait for another third touch input.

If it is determined that the second touch input is within the selected region, then in In step 811, the processor 120 determines whether the third touch input is within a selected region with respect to one or more imaginary axes passing through the position of the second touch input.

In step 813, the processor 120 determines whether the third touch input coincides at least partly with the stored pattern, based on whether the third touch input is within the selected region. The processor 120 determines whether specific identification information corresponding to the selected region coincides with a pattern stored in advance. In this instance, the specific identification information includes information detected in step 808 and information detected in step 813.

In step 814, when the specific identification information coincides with the stored pattern, the processor 120 controls to release the locked state. When the specific identification information does not coincide with the stored pattern, the processor 120 performs step 809 again.

Figure 9:
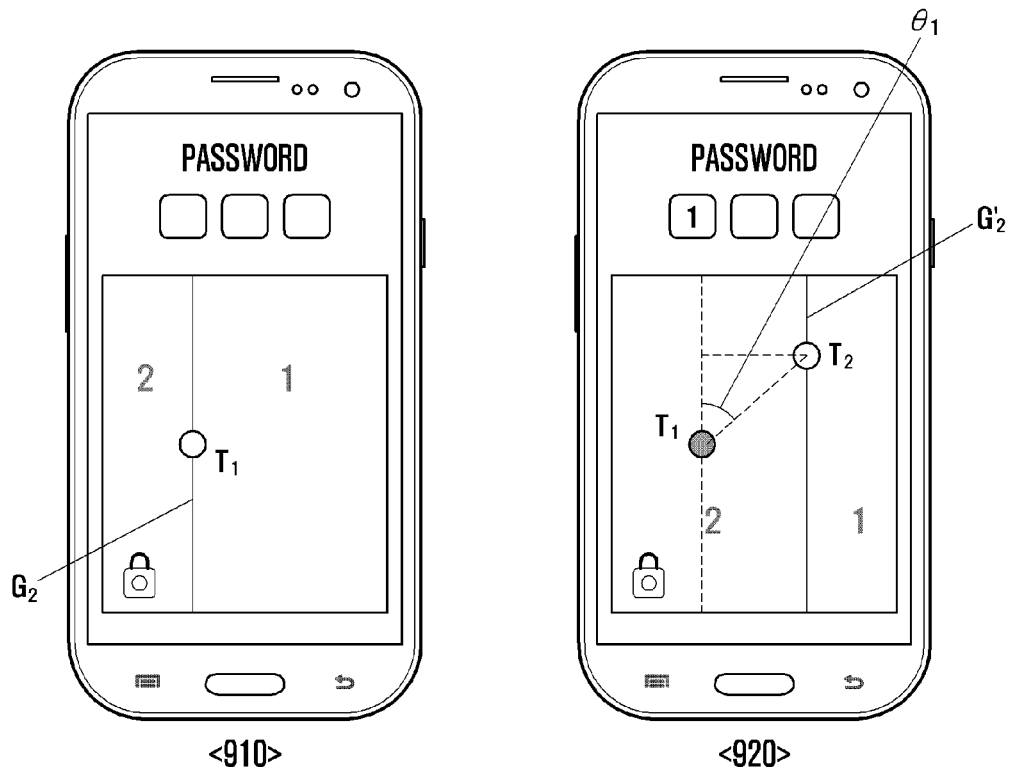
FIG. 9 illustrates an example of releasing a lock using a multi-touch, according to an embodiment of the present invention.

FIG. 9 illustrates an example of releasing a lock using a multi-touch, according to an embodiment of the present invention.

Referring to FIG. 9, an electronic device 101 illustrating a coordinate axis guide based on a vertical two-direction type is provided. Reference numeral 910 illustrates an example of setting a first touch input T1, that is initially detected, as a reference touch in the display 160 on a lock screen. In this instance, the display 160 displays a coordinate axis guide G2 for the reference touch T1.

Reference numeral 920 illustrates a case of setting a detected touch T2 as an object touch in the display 160 when the user touches a right region. The processor 120 determines whether the object touch T2 is within a selected region with respect to an imaginary axis, i.e., coordinate axis guide G2, passing through the position of the reference touch T1. The processor 120 determines whether an angle θ1 formed between an imaginary line (represented by a dotted line), connecting the reference touch T1 and the object touch T2, and the imaginary axis, i.e., coordinate axis guide G2 is within a selected range, and thereby determines whether the object touch T2 is within the selected region. In reference numeral 620, the processor 120 detects specific identification information corresponding to the angle θ1 as '1'. The display 160 displays the detected specific identification information '1'. The processor 120 determines whether the object touch T2 coincides at least partly, with a pattern stored in advance, based on whether the object touch T2 is within the selected region. When the object touch T2 does not coincide with the stored pattern, the processor 120 may wait for the following touch input of a user. In this case, the processor 120 sets the object touch T2 as the reference touch. When the object touch T2 is set as the reference touch, the display 160 changes and displays the coordinate axis guide to G2', as the coordinates of the reference touch are changed to T2.

Reference numeral 930 illustrates a case in which a detected touch input T3 is set as the object touch in the display 160 when the user touches the right region. The processor 120 determines whether the object touch T3 is within a selected region with respect to the imaginary axis G2' passing through the position of the object touch T3 with respect to the reference touch T2. The processor 120 determines whether an angle θ2 formed between an imaginary line, connecting the reference touch T2 and the object touch T3, and the imaginary axis G2' is within a selected range, and thereby determines whether the object touch T3 is within the selected region. In the reference numeral 930, the processor 120 detects specific identification information corresponding to the angle θ2 as '1'. The display 160 displays the detected specific identification information '1'. The processor 120 determines whether the object touch T3 coincides at least partly with a pattern stored in advance, based on whether the object touch T3 is within the selected region. When the object touch T3 does not coincide with the stored pattern, the processor 120 may wait for the following touch input of a user. In this case, the processor 120 sets the object touch T3 as the reference touch. When the object touch T3 is set as the reference touch, the display 160 changes and displays the coordinate axis guide to G2", as the coordinates of the reference touch are changed to T3.

Reference numeral 940 illustrates an example of detecting specific identification information corresponding to the number of multi-touches when the user touches two or more multi-touches. When a detected fourth touch input includes a plurality of touch points T4-1 and T4-2, the processor 120 determines the fourth touch input as a multi-touch input. The processor 120 normalizes a touch region including the plurality of touch points included in the first touch input as a circular region 940a. The processor 120 sets the center coordinates of the circular region 940a as the position of the fourth touch input represented by reference numeral T4. The processor 120 determines whether the fourth touch input T4 is within a selected region with respect to one or more imaginary axes passing through the position of the third touch input T3.

The processor 120 determines whether an angle θ3 formed between an imaginary line, connecting the third touch input T3 and the fourth touch input T4, and the imaginary axis, i.e. a coordinate axis guide G2" is within a selected range, and thereby determines whether the object touch input T4 is within the selected region. In reference numeral 940, the processor 120 detects specific identification information corresponding to the angle θ3 as 'A'. The display 160 displays the detected specific identification information 'A' as shown by reference numeral 940b. The processor 120 determines whether the object touch T4 coincides at least partly with a pattern stored in advance, based on whether the object touch T4 is within the selected region. When the object touch T4 coincides with the stored pattern, the display 160 displays an unlocked padlock-shaped icon, and thereby indicates that the locked state of the electronic device 101 is released.

Figure 10:
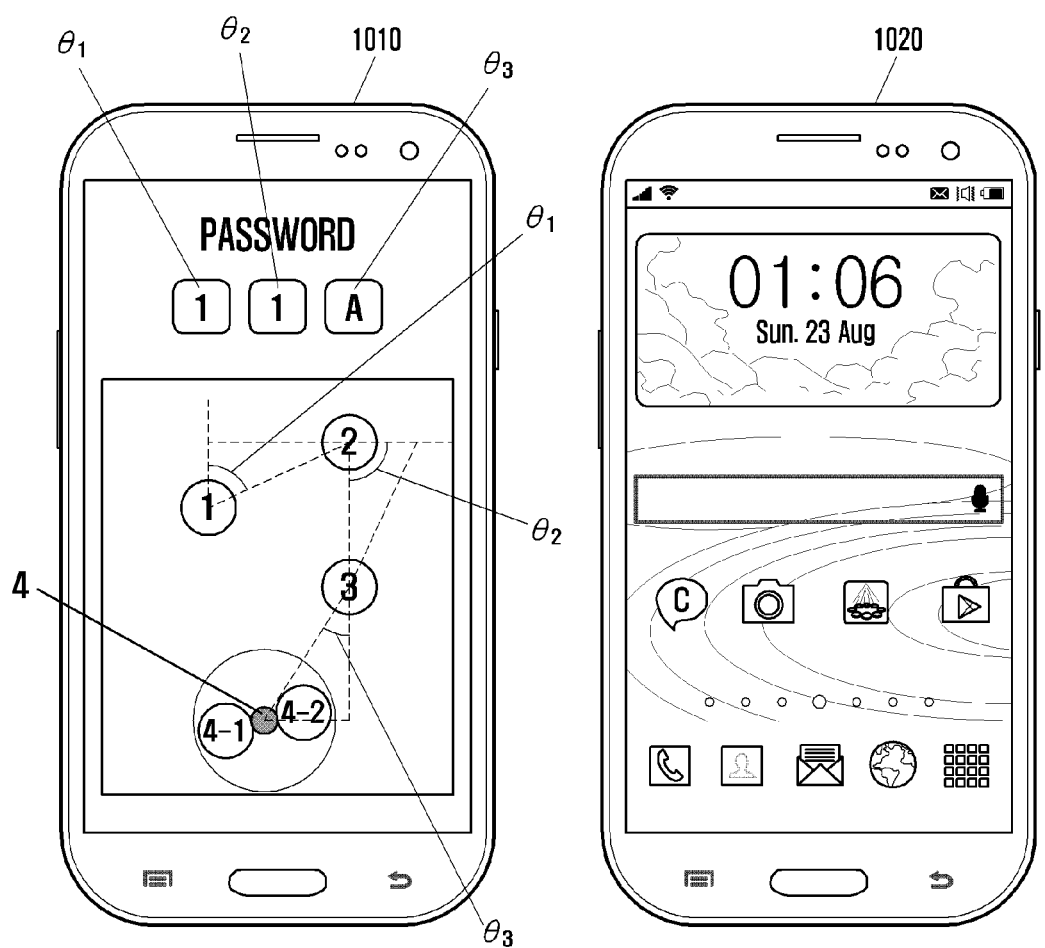
FIG. 10 illustrates an example of releasing a lock using a single-touch and a multi-touch, according to an embodiment of the present invention.

FIG. 10 illustrates an example of releasing a lock using a single-touch and a multi-touch, according to an embodiment of the present invention.

Referring to FIG. 10, reference numeral 1010 illustrates an example of an electronic device 101 receiving an input of a single-touch and a multi-touch. Reference numerals ①, ②, and ③ represent a single-touch that touches one point and releases the touch. The single-touch may be a 'tap' input. Reference numeral ④ represents a multi-touch that touches two or more points ④-1 and ④-2 and releases the touch. When the touch inputs, such as the reference numerals ①, ②, and ③, have a single touch point, the processor 120 determines the corresponding touch input as the single-touch. As to the single-touch, the processor 120 detects specific identification information corresponding to an angle θ1 formed between an imaginary line, connecting the reference numerals ① and ②, and the imaginary axis as '1'. Similarly, the processor 120 detects specific identification information corresponding to an angle θ2 formed between an imaginary line, connecting the reference numerals ② and ③, and the imaginary axis as '1'.

When the touch inputs, such as the reference numerals ④-1 and ④-2, have a plurality of touch points, the processor 120 determines the corresponding touch input as the 'multi-touch'. The processor 120 normalizes a touch region including the reference numerals ④-1 and ④-2, which are the multi-touches, as a circular region, and sets the reference numeral ④, which is the center coordinate of the circular region, as the position of the second touch input. The processor 120 detects specific identification information corresponding to an angle θ3 formed between an imaginary line, connecting the reference numerals ③ and ④, and the imaginary axis as 'A'. In this manner, the processor 120 sets specific identification information different from each other with respect to the single-touch and the multi-touch.

Reference numeral 1020 illustrates an example of a home screen displayed in the display 160 when the lock of the electronic device 101 is released. When the specific identification information detected in reference numeral 1010 coincides with the stored pattern, the display 160 displays the home screen.

While the present invention has been shown and described with reference to certain embodiments, it will be understood by those skilled in the art that various changes in form and details may be made therein without departing from the spirit and scope of the present invention. Therefore, the scope of the present invention is defined not by the detailed description of the present invention, but by the appended claims and their equivalents, and thus, all differences within the scope will be construed as being included in the present invention.

What is claimed is:

1. An electronic device comprising:
   a touch screen display; and
   a processor configured to receive two or more touch inputs in a locked state of the electronic device and to release the locked state when the two or more touch inputs coincide with a pattern stored in advance, and
   wherein the processor is further configured to:
   receive a first touch input through the display in the locked state of the electronic device,
   receive a second touch input through the display after receiving the first touch input,
   determine whether the second touch input is within a selected region with respect to one or more imaginary axes passing through a position of the first touch input,
   receive a third touch input through the display after receiving the second touch input,
   determine whether the third touch input is within a selected region with respect to one or more other imaginary axes passing through a position of the second touch input; and
   determine whether the second touch input and the third touch input coincide at least partly with the stored pattern, based on whether the second touch input is within the selected region and whether the third touch input is within the selected region.

2. The electronic device of claim 1, wherein the processor further configured to determine whether an angle formed between an imaginary line, connecting the first touch input and the second touch input, and the one or more imaginary axes is within a selected range, and determine whether the second touch input is within the selected region.

3. The electronic device of claim 1, wherein the processor is further configured to determine one or more touch inputs among the two or more touch inputs as a single-touch having a single-touch point or a multi-touch having a plurality of touch points.

4. The electronic device of claim 3, wherein the processor is further configured to normalize a touch region corresponding to the one or more touch inputs as a circular region, and determine the center coordinates of the circular region as coordinates of the one or more touch inputs.

5. The electronic device of claim 4, wherein the processor is configured to, when the one or more touch inputs are multi-touch inputs, normalize a touch region including a plurality of touch points included in the multi-touch as the circular region, and determine whether the corresponding one or more touch inputs coincide with the stored pattern based on whether the center coordinates of the circular region are within the selected region.

6. The electronic device of claim 3, wherein the processor is further configured to set specific identification information different from each other with respect to the single-touch and the multi-touch.

7. The electronic device of claim 6, wherein the processor is further configured to, when each of the one or more touch inputs is a multi-touch input, detect a number of touch points included in the multi-touch, combine specific identification information set in advance in response to the number of the touch points as additional information, and determine whether the corresponding one or more touch inputs coincide with the stored pattern based on the selected region and a part of the combined information.

8. The electronic device of claim 1, wherein the processor is further configured to, when one or more touch inputs among the two or more touch inputs are detected, display a coordinate axis guide in a region adjacent to the one or more touch inputs, through the display, in response to the one or more imaginary axes.

9. The electronic device of claim 1, wherein the processor is further configured to determine at least one of a number of axes, a reference angle range, and a direction of a reference axis with respect to the one or more imaginary axes, in response to a direction type set by a user among a vertical two-direction type, a horizontal two-direction type, a four-direction type, and an eight-direction type, which are stored in advance.

10. The electronic device of claim 1, wherein the processor is further configured to calculate a distance of an imaginary line connecting the first touch input and the second touch input, determine whether the distance is within a predetermined distance range, and determine whether the second touch input is within the selected region.

11. The electronic device of claim 1, wherein the processor is further configured to classify each of the two or more touch inputs, which are input within a predetermined time, into a single-touch having a single-touch point or a multi-touch having a plurality of touch points, and detect the classified touch input as a single input.

12. A method for releasing a lock of an electronic device including a touch screen display, the method comprising:
receiving a first touch input through the display in a locked state of the electronic device;
receiving a second touch input through the display after receiving the first touch input;
determining whether the second touch input is within a selected region with respect to one or more imaginary axes passing through a position of the first touch input;
receiving a third touch input through the display after receiving the second touch input;
determining whether the third touch input is within a selected region with respect to one or more other imaginary axes passing through a position of the second touch input;
determining whether the second touch input and the third touch input coincide at least partly with a pattern stored in advance, based on whether the second touch input is within the selected region and whether the third touch input is within the selected region; and
controlling to release the locked state when the second touch input and the third touch input coincide with the stored pattern.

13. The method of claim 12, wherein determining whether the second touch input is within the selected region comprises:determining whether an angle formed between an imaginary line, connecting the first touch input and the second touch input, and the one or more imaginary axis is within a selected range.

14. The method of claim 12, further comprising:
determining the first touch input or the second touch input as a single-touch having a single-touch point or a multi-touch having a plurality of touch points.

15. The method of claim 14, wherein determining the first touch input or the second touch input comprises:
normalizing a touch region corresponding to the first touch input or the second touch input as a circular region; and
determining center coordinates of the circular region as coordinates of the first touch input or the second touch input.

16. The method of claim 15, wherein determining whether the second touch input coincides at least partly with the stored pattern comprises:
when the one or more touch inputs are the multi-touch,
normalizing a touch region including a plurality of touch points included in the multi-touch as the circular region, and
determining whether the second touch input coincides with the stored pattern, based on whether center coordinates of the circular region are within the selected region.

17. The method of claim 14, further comprising:
setting specific identification information different from each other with respect to the single-touch and the multi-touch.

18. The method of claim 14, wherein determining whether the second touch input coincides at least partly with the stored pattern comprises:
when each of the touch inputs is the multi-touch,
detecting a number of touch points included in the multi-touch,
combining specific identification information set in advance in response to the number of the touch points as additional information, and
determining whether the second touch input coincides with the stored pattern based on the selected region and a part of the combined information.

19. The method of claim 12, further comprising:
displaying a coordinate axis guide in a region adjacent to the first touch input in response to the imaginary axis, after receiving the first touch input.

20. The method of claim 12, further comprising:
determining at least one of a number of axes, a reference angle range, and a direction of a reference axis with respect to the one or more imaginary axes, in response to one direction type set by a user among a vertical two-direction type, a horizontal two-direction type, a four-direction type, and an eight-direction type which are stored in advance.

21. The method of claim 12, wherein determining whether the second touch input is within the selected region comprises:
calculating a distance of an imaginary line connecting the first touch input and the second touch input: and
determining whether the distance is within a predetermined distance range.

22. The method of claim 12, wherein receiving of the first touch input and receiving of the second touch input comprises:
classifying the first touch input or the second touch input, which is input within a predetermined time, into a single-touch having a single-touch point or a multi-touch having a plurality of touch points; and
detecting the classified touch input as a single input.

* * * * *